(12) United States Patent
Takahashi

(10) Patent No.: US 9,543,868 B2
(45) Date of Patent: Jan. 10, 2017

(54) APPARATUS FOR CONTROLLING ROTARY ELECTRIC MACHINE

(71) Applicant: DENSO CORPORATION, Kariya, Aichi-pref. (JP)

(72) Inventor: Hidekazu Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/169,860

(22) Filed: Jun. 1, 2016

(65) Prior Publication Data

US 2016/0352269 A1 Dec. 1, 2016

(30) Foreign Application Priority Data

Jun. 1, 2015 (JP) ................................. 2015-111470

(51) Int. Cl.
*H02P 21/00* (2016.01)
*H02P 6/08* (2016.01)

(52) U.S. Cl.
CPC .. *H02P 6/28* (2016.02); *H02P 6/08* (2013.01)

(58) Field of Classification Search
CPC ........... H02P 6/14; H02P 21/0035; H02P 6/16; Y02T 10/642; Y02T 10/7005; H02H 7/0851
USPC ........................ 318/432, 434, 400.01, 400.02
See application file for complete search history.

(56) References Cited

U.S. PATENT DOCUMENTS

| | | | | |
|---|---|---|---|---|
| 5,587,891 | A * | 12/1996 | Nakata | B60L 9/22 363/41 |
| 7,986,116 | B2 * | 7/2011 | Imura | H02P 21/0003 318/400.02 |
| 8,018,185 | B2 * | 9/2011 | Yamamoto | B60L 15/025 318/400.02 |
| 2009/0243522 | A1 * | 10/2009 | Suhama | B60L 7/16 318/376 |
| 2010/0123418 | A1 | 5/2010 | Itoh et al. | |
| 2014/0152205 | A1 | 6/2014 | Nakai | |

FOREIGN PATENT DOCUMENTS

JP 2010-183661 A 8/2010

* cited by examiner

*Primary Examiner* — Rina Duda
(74) *Attorney, Agent, or Firm* — Oliff PLC

(57) ABSTRACT

In an apparatus, a first control unit performs current-feedback control, and a second control unit performs torque-feedback control. The torque-feedback control samples values of each output current at phases. The sampled values of each output current at the phases are referred to as phase-related sampled values of the corresponding output current. The apparatus causes the second control unit to sample values of each output current at the predetermined phases while the first control unit is performing the current-feedback control when switching the current-feedback control to the torque-feedback control. The second control unit uses the values of each output current sampled by the first control unit as the phase-related sampled values of the corresponding output current to start the torque-feedback control when the current-feedback control is switched to the torque-feedback control.

9 Claims, 9 Drawing Sheets

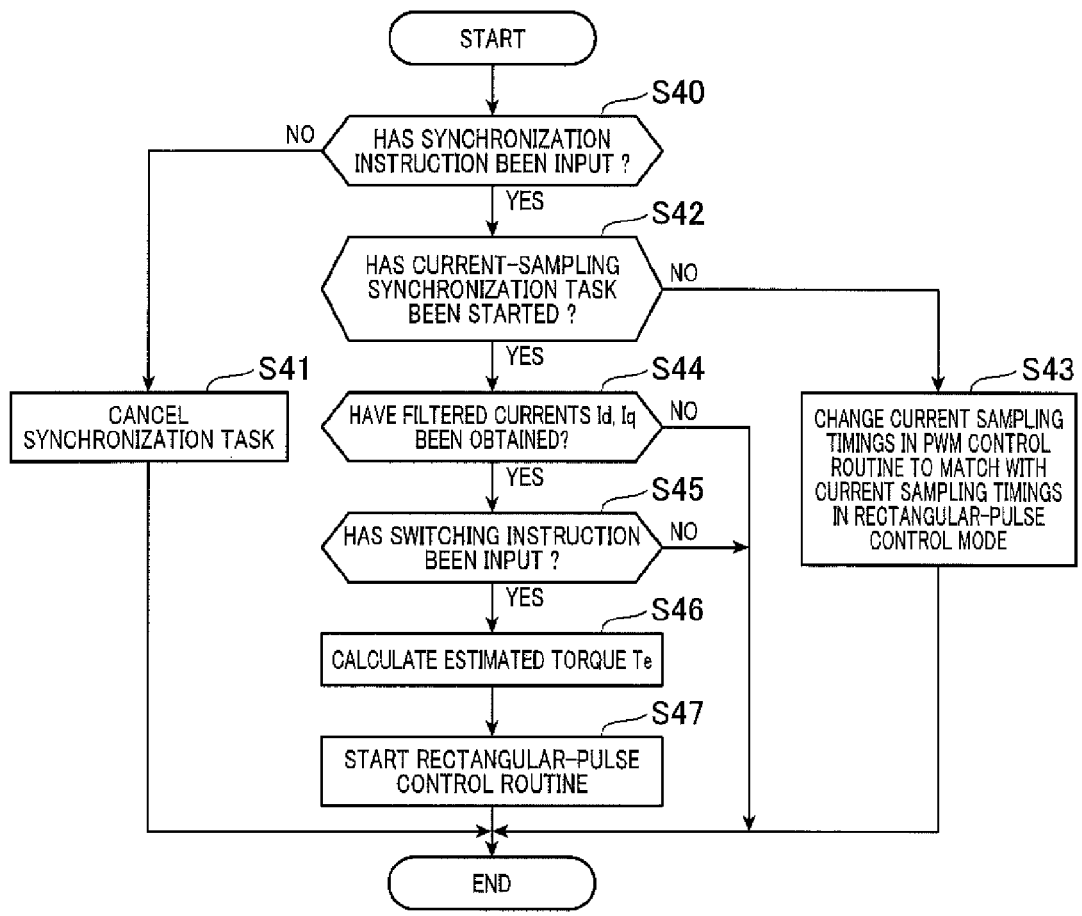

APPARATUS FOR CONTROLLING ROTARY ELECTRIC MACHINE

CROSS REFERENCE TO RELATED APPLICATIONS

This application is based on and claims the benefit of priority from Japanese Patent Application 2015-111470 filed on Jun. 1, 2015, the disclosure of which is incorporated in its entirety herein by reference.

TECHNICAL FIELD

The present disclosure relates to apparatuses for adjusting an output voltage of an inverter to a rotary electric machine to control the rotary electric machine accordingly.

BACKGROUND

There are various control methods for adjusting an output voltage, i.e. an alternating-current (AC) voltage, of an inverter to a rotary electric machine to control the rotary electric machine accordingly. The various control routines include, as two typical control routines, a pulse-width modulation (PWM) control routine and a torque-feedback control routine; the PWM control routine is a type of current-feedback control routines.

The PWM control routine sets a sinusoidal base voltage as a voltage command for the output voltage of an inverter based on both a command value for output torque of a rotary electric machine and output currents output from the inverter to the rotary electric machine. Next, the PWM control routine compares the sinusoidal base voltage with a carrier wave having a higher frequency than the frequency of the sinusoidal base voltage. Then, the PWM control routine controls, based on the comparison results, the inverter to adjust the output voltage of the inverter accordingly.

The torque-feedback control routine obtains measured values of output currents, each of which has a predetermined phase, to a rotary electric machine. Then, the torque-feedback control routine calculates an estimated value of output torque of the rotary electric machine according to the measured values of the output currents. The torque-feedback control routine compares the estimated value of the output torque with a command value for the output torque of the rotary electric machine. The torque-feedback control routine adjusts, based on the comparison results, the pattern of a pulse output voltage to be output to the rotary electric machine.

The PWM control routine has an advantageous effect of reducing fluctuations of the output torque in a low rotational speed of the rotary electric machine, but may limit the voltage utilization factor of the inverter. The torque-feedback control routine has a higher inverter voltage utilization factor, but may have more fluctuated output torque of the rotary electric machine in a low rotational speed range thereof. In view of these circumstances, some control apparatuses are configured to selectively use the PWM control routine and the torque-feedback control routine to control a rotary electric machine, one example of which is disclosed in Japanese Patent Publication No. 5368777.

SUMMARY

As described above, the torque-feedback control routine requires measured values of the output currents, each of which has a predetermined phase, to a rotary electric machine. When switching the PWM control routine to the torque-feedback control routine, such a control apparatus, which selectively uses the PWM control routine and the torque-feedback control routine, therefore needs to obtain measured values of the output currents, each of which has a predetermined phase, to a rotary electric machine.

That is, when switching the PWM control routine to the torque-feedback control routine, such a control apparatus needs to interrupt feedback control of the rotary electric machine until obtaining measured values of the output currents. This may reduce the responsivity of the output torque of the rotary electric machine to the command value for the output torque.

In view of the circumstances set forth above, one aspect of the present disclosure seeks to provide apparatuses for controlling a rotary machine, each of which is capable of maintaining higher responsivity of the output torque of the rotary electric machine to a command value for the output torque when switching the PWM control routine to the torque-feedback control routine.

According to an exemplary aspect of the present disclosure, there is provided an apparatus for adjusting an output voltage from an inverter to a rotary electric machine to control the rotary electric machine accordingly. The apparatus includes a first control unit configured to perform a current-feedback control routine. The current-feedback control routine is configured to set a sinusoidal voltage command based on command torque for output torque of the rotary electric machine and the output currents. The current-feedback control routine is configured to compare the sinusoidal voltage command with a periodic carrier signal to control the output voltage accordingly. The apparatus includes a second control unit configured to perform a torque-feedback control routine. The torque-feedback control routine is configured to sample values of each of the output currents at predetermined phases. The sampled values of each of the output currents at the predetermined phases are referred to as phase-related sampled values of the corresponding output current. The torque-feedback control routine is configured to control, based on the phase-related sampled values of each of the output currents and the command torque, a waveform of the output voltage. The apparatus includes a switching control unit. The switching control unit is configured to switch control of the rotary electric machine between the current-feedback control routine and the torque-feedback control routine. The switching control unit is configured to cause the second control unit to sample values of each of the output currents at the predetermined phases of the corresponding output current while the first control unit is performing the current-feedback control routine when switching the current-feedback control routine to the torque-feedback control routine. The second control unit is configured to use the values of each of the output currents sampled while the first control unit is performing the current-feedback control routine as the phase-related sampled values of the corresponding output current to start the torque-feedback control routine when the current-feedback control routine is switched to the torque-feedback control routine.

The apparatus according to the exemplary aspect of the present disclosure enables the second control unit to sample values of each of the output currents at the predetermined phases while the first control unit is performing the current-feedback control routine when switching the current-feedback control routine to the torque-feedback control routine. Then, the second control unit is configured to use the values of each of the output currents sampled while the first control unit is performing the current-feedback control routine as the phase-related sampled values of the corresponding output current to start the torque-feedback control routine when the current-feedback control routine is switched to the torque-feedback control routine.

This therefore prevents the torque responsivity of the rotary electric machine from decreasing when control of the rotary electric machine is switched from the current-feedback control routine to the rectangular-pulse control routine.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 13 is a flowchart schematically illustrating a switching control routine carried out by a control apparatus according to the second embodiment of the present disclosure.

DETAILED DESCRIPTION OF EMBODIMENT

Figure 1:
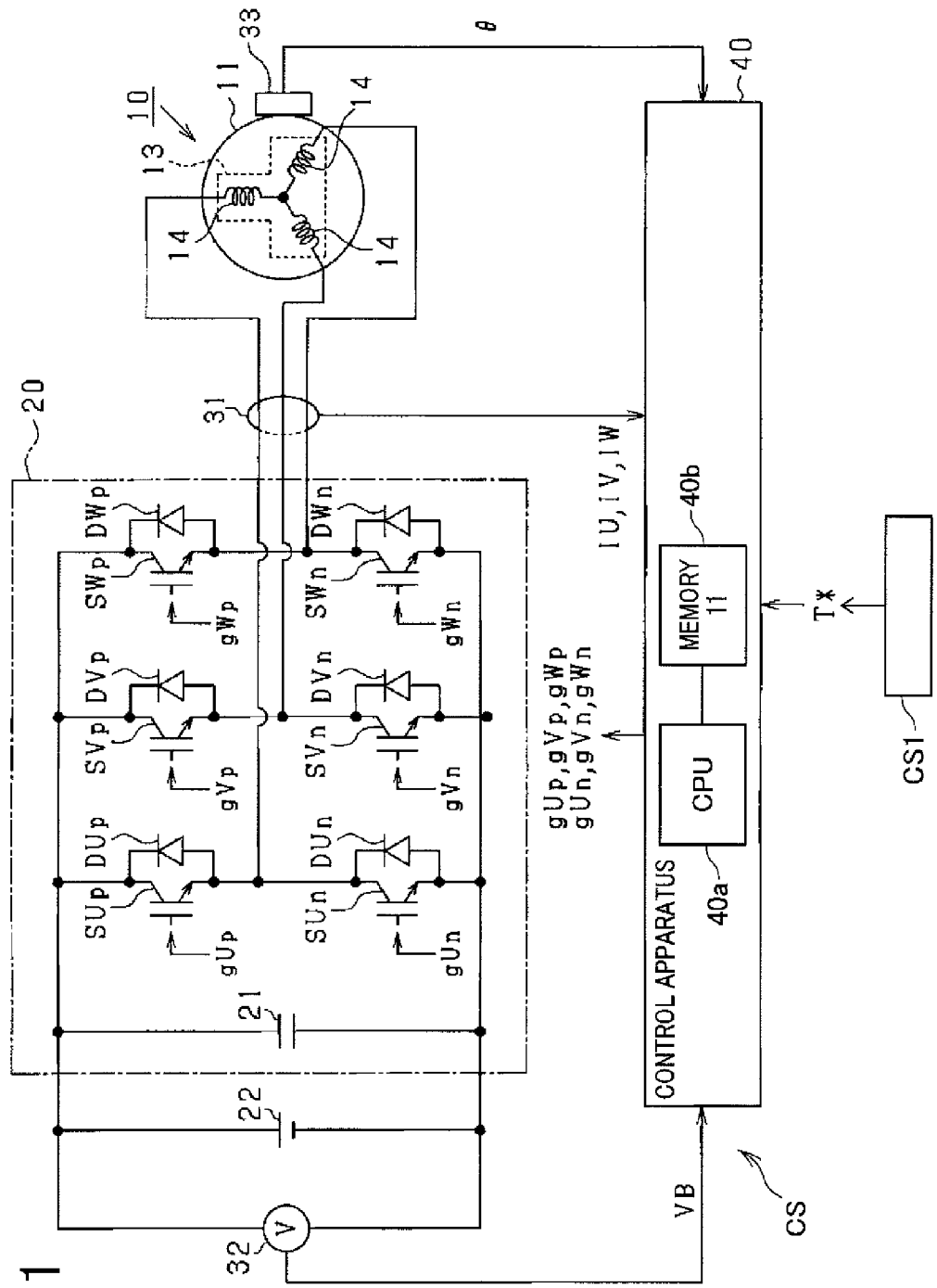
FIG. 1 is a circuit diagram of a control system for controlling a motor-generator according to the first embodiment of the present disclosure.

The following describes embodiments of the present disclosure with reference to the accompanying drawings. In the embodiments, like parts between the embodiments, to which like reference characters are assigned, are omitted or simplified in description to avoid redundant description.

First Embodiment

FIG. 1 illustrates a control system CS for controlling a three-phase motor-generator, referred to simply as "motor-generator" 10 installed in a target vehicle as an example of rotary machines according to the present disclosure.

For example, the motor-generator 10 is a permanent magnet synchronous three-phase motor-generator as an example of multiphase rotary electric machines. Specifically, the motor-generator 10 is provided with a rotor 11 and a stator 13. The rotor 11 is provided with at least one pair of permanent magnets.

The rotor 11 has a direct axis (d-axis) in line with a direction of magnetic flux created by an N pole of the at least one pair of permanent magnets. The rotor 11 also has a quadrature axis (q-axis) with a phase being $\pi/2$-radian electrical angle leading with respect to a corresponding d-axis during rotation of the rotor 11. In other words, the q-axis is electromagnetically perpendicular to the d-axis. The d and q axes constitute a d-q coordinate system, i.e. a two-phase rotating coordinate system, defined relative to the rotor.

The stator 13 includes a stator core such that the rotor 11 is rotatably arranged with respect to the stator core. The stator 13 also includes a set of three-phase windings, i.e. armature windings, 14 wound in the stator core.

The three-phase, i.e. U-, V, and W-phase, stator windings 14 are wound in the stator core such that the U-, V-, and W-phase windings 14 are shifted by an electrical angle of, for example, $2\pi/3$ radian in phase from each other.

For example, the three-phase armature windings, i.e. U-, V-, and W-phase windings, 14 each have one end connected to a common junction, i.e. a neutral point, and the other end to a separate terminal in, for example, a star-configuration.

Note that the motor-generator 10 can be designed as a wound-field synchronous motor.

The d-axis of the rotor 11 has an inductance Ld, and the q-axis of the rotor 11 has an inductance Lq.

The control system CS includes an inverter 20, a direct-current (DC) power source 22, various sensors, and a control apparatus 40.

The separate terminals of the three-phase armature windings 14 are coupled to the inverter 20. The inverter 20 is connected to the DC power source 22.

The inverter 20 is designed as a three-phase inverter. The inverter 20 is provided with a first pair of series-connected upper- and lower-arm (high- and low-side) switches SUp and SUn, a second pair of series-connected upper- and lower-arm switches SVp and SVn, and a third pair of series-connected upper- and lower-arm switches SWp and SWn.

The inverter 20 is also provided with flywheel diodes DUp, DUn, DVp, DVn, DWp, and DWn electrically connected in antiparallel to the respective switches SUp, SUn, SVp, SVn, SWp, and SWn.

The first embodiment uses IGBTs as the respective switches $S\alpha\#$ ($\alpha$=U, V, and W, and #=p and n). When power MOSFETs, such as N-channel MOSFETs, are used as the switches $S\alpha\#$, intrinsic diodes of the power MOSFETs can be used as the flywheel diodes, thus eliminating the need for external flywheel diodes.

The first to third pairs of switches are parallely connected to each other in bridge configuration. The connection point through which the switches SUp and SUn of the first pair are connected to each other in series is connected to an output lead extending from the separate terminal of the U-phase winding 14. Similarly, the connection point through which the switches SVp and SVn of the second pair are connected to each other in series is connected to an output lead extending from the separate end of the V-phase winding 14. Moreover, the connection point through which the switches SWp and SWn of the third pair are connected to each other in series is connected to an output lead extending from the separate end of the W-phase winding 14.

The inverter 20 has high-voltage terminals, i.e. collector-side terminals, of the series-connected switches of the first, second, and third pairs. The high-voltage terminals of the inverter 20 are connected to the positive terminal of the DC power source 22. The inverter 20 also has low-voltage terminals, i.e. emitter-side terminals, of the series-connected switches of the first, second, and third pairs. The low-voltage terminals of the inverter 20 are connected to the negative terminal of the DC power source 22.

The inverter 20 includes a smoothing capacitor 21 connected to the high-voltage terminals and the low-voltage terminals thereof in parallel to the DC power source 22. The smoothing capacitor 21 is operative to perform a first smoothing operation of a voltage input from the DC power source 22 and a second smoothing operation of a voltage input from the inverter 20.

The sensors include a current sensor 31, a voltage sensor 32, and a rotational angle sensor 33.

The current sensor 31 is arranged to measure instantaneous values of U-, V-, and W-phase alternating currents, i.e. three-phase currents, IU, IV, and IW actually flowing through the respective U-, V-, and W-phase windings 14 of the stator 13. That is, the stator 13 has a UVW coordinate system having fixed three axes corresponding to the respective three-phase windings 13 of the stator 13. The three-phase currents IU, IV, and IW are currents flowing in the respective three axes of the UVW coordinate system.

The current sensor 31 is communicable with the control apparatus 40, so that the control apparatus 40 obtains the instantaneous value of each of the U-, V-, and W-phase alternating currents IU, IV, and IW measured by the current sensor 31.

Note that the current sensor 31 can be configured to measure instantaneous values of two-phase alternating currents, such as the V- and W-phase alternating currents IV and IW, calculate the instantaneous value of the remaining phase alternating current, such as the U-phase alternating current IU. Then, the current sensor 31 can be configured to send, to the control apparatus 40, the instantaneous value of each of the U-, V-, and W-phase alternating currents IU, IV, and IW. Note that U-, V-, and W-phase voltages applied to the respective U-, V-, and W-phase armature windings 14 will be referred to as U-, V-, and W-phase voltages VU, VV, and VW.

The voltage sensor 32 is arranged to measure an output voltage VB output from the DC power source 22, i.e. an input voltage VB input to the inverter 20. The voltage sensor 22 is communicable with the control apparatus 40, and operative to send, to the control apparatus 40, the output voltage VB.

The rotational angle sensor 33 is operative to measure a rotational angle, i.e. an electrical rotational angle, $\theta$ of the rotor 11; the rotational angle $\theta$ of the rotor 11 of the motor-generator 10 represents a rotational angle of the d-axis of the rotor 11. The rotational angle sensor 33 is communicable with the control apparatus 40, and operative to send, to the control apparatus 40, the monitored rotation angle $\theta$ of the rotor 11.

The control apparatus 40 is designed as, for example, a computer circuit including essentially of, for example, a CPU 40a and a memory 40b serving as, for example, a storage according to the present disclosure. The control apparatus 40 is connected to, for example, a control system CS1 for inputting, to the control apparatus 40, a command value, i.e. a request value for the output torque of the motor-generator 10. For example, a higher-order control system, which controls the control apparatus 40, can be used as the control system CS1 if the control apparatus 40 and the control system CS1 are arranged in a hierarchical relationship. The following refers to the command value for the output torque of the motor-generator 10 as a command torque T*.

The control apparatus 40 is configured to receive, i.e. obtain, the measured values output from the sensors 31, 32, and 33, and the command torque T* as received pieces of data. Then, the control apparatus 40 is configured to periodically generate, based on the received pieces of data set forth above, drive signals, i.e. pulse-width modulated (PWM) signals, gUp, gVp, gWp, gUn, gVn, and gWn for individually driving the respective switches SUp, SUn, SVp, SVn, SWp, and SWn. The control apparatus 40 is operative to output the drive signals gUp, gVp, gWp, gUn, gVn, and gWn the control terminals, i.e. the gates, of the respective switches SUp, SUn, SVp, SVn, SWp, and SWn. This individually turns on or off, i.e. closes or opens, the respective switches SUp, SUn, SVp, SVn, SWp, and SWn, thus converting the input voltage VB to the inverter 20 into a controlled AC voltage, so that the controlled AC voltage is supplied to the motor-generator 10. The controlled AC voltage enables the output torque of the motor-generator 10 to follow the command torque T*.

For example, the control apparatus 40 outputs the drive signals $g\alpha\#$ that complementarily turns on the upper- and lower-arm switches Sap and San for each leg, i.e. each phase ($\alpha$=U, V, and W), while dead times during which the upper- and lower-arm switches $S\alpha p$ and $S\alpha n$ are simultaneously turned off are ensured, Introducing the dead time prevents the upper and lower-arm switches $S\alpha p$ and $S\alpha n$ from being simultaneously on.

Each of the drive signals $g\alpha\#$ ($\alpha$=U, V, and W, and #=p and n) has a predetermined duty factor, i.e. a controllable on-pulse width for each switching cycle, in other words, a predetermined ratio, i.e. percentage, of on duration to the total duration of each switching cycle for a corresponding one of the switches $S\alpha\#$.

Figure 2:
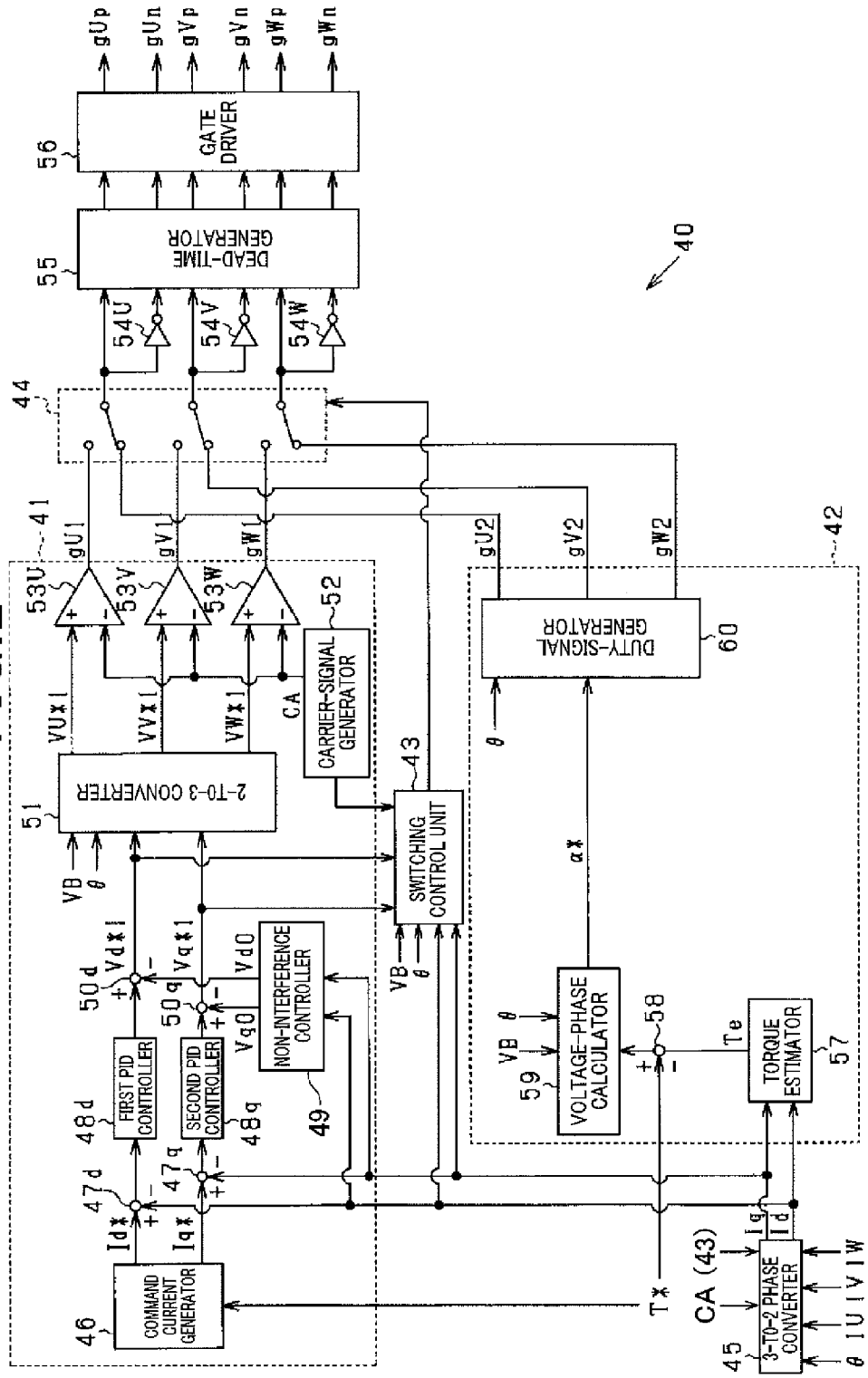
FIG. 2 is a block diagram schematically illustrating an example of the specific structure of a control apparatus of the control system according to the first embodiment.

Next, the following describes an example of the specific structure of the control apparatus 40 with reference to FIG. 2. The control apparatus 40 includes a PWM control unit 41 serving as a first control unit, a rectangular-pulse control unit 42 serving as a second control unit, and a switching control unit 43. The control apparatus 40 also includes a selector 44, NOT circuits 54U, 54V, and 54W, a dead-time generator 55, and a gate driver 56.

For example, the units 41 to 45, 55, and 56 can be implemented in the control apparatus 40 as hardware units, software units, and/or hardware-software hybrid units.

The PWM control unit 41 is configured to perform a PWM control routine, i.e. a current-feedback control routine, described later based on the measured values output from the sensors 31, 32, and 33, and the command torque T*. The rectangular-pulse control unit 42 is configured to perform a rectangular-pulse control routine, i.e. a torque-feedback control routine, described later based on the measured values output from the sensors 31, 32, and 33, and the command torque T*. The switching control unit 43 and the selector 44 are configured to cooperatively perform a switching control routine that selects one of the PWM control routine carried out by the PWM control unit 41 and the rectangular-pulse control routine carried out by the rectangular-pulse control unit 42.

Note that the rectangular-pulse control routine, which is also called a one-pulse control routine, is configured to cause each of three-phase voltages VU, VV, VW applied to a corresponding one of the three-phase windings 14 to change in the order of VB/2, 0, and −VB/2 in each cycle of the electrical rotational angle θ of the rotor 11 while an energization interval of each of the three-phase windings 14 is 180 degrees in electrical angle.

The following describes the PWM control routine, the rectangular-pulse control routine, and the switching control routine in this order.

PWM Control Routine

The PWM control unit 41 functionally includes a three-to-two phase converter (3-to-2 phase converter) 45, a command-current generator 46, first and second deviation calculators 47d and 47q, and first and second PID controller 48d and 48q. The PWM control unit 41 also functionally includes a non-interference controller 49, first and second correctors 50d and 50q, a two-to-three phase converter (2-to-3 phase converter) 51, a carrier-signal generator 52, and first to third comparators 53U, 53V, and 53W.

Note that a dashed rectangular block, to which reference numeral 41 is assigned, represents the PWM control unit 41. Because the PWM control unit 41 and the rectangular-pulse control unit 42 share the three-to-two phase converter 45, the three-to-two phase converter 45 is excluded from the dashed rectangular block 41.

The three-to-two phase converter 45 samples, according to the phase of a periodic carrier signal CA described later, the instantaneous values of the three-phase currents IU, IV, and IW measured by the current sensor 31, and also receives the electrical rotational angle θ of the d-axis of the rotor 11 sent from the rotational angle sensor 33. Then, the three-to-two phase converter 45 converts the instantaneous values of the three-phase currents IU, IV, and IW in the UVW coordinate system into a d-axis current Id and a q-axis current Iq in the d-q coordinate system of the rotor 11 based on the electrical rotational angle θ of the rotor 11 and a predetermined relationship between the above parameters IU, IV, IW, Id, Iq, and θ.

How the three-to-two phase converter 45 in the PWM control routine obtains the instantaneous values of the three-phase currents IU, IV, and IW measured by the current sensor 31 will be described later.

The command-current generator 46 generates a d-axis command current Id* and a q-axis command current Iq* based on the command torque T* input to the control apparatus 40 and a predetermined relationship between the parameters Id*, Iq*, and T*.

The first deviation calculator 47d subtracts the d-axis current Id from the d-axis command current Id* to calculate a current deviation ΔId between the d-axis current Id and the d-axis command current Id*. Similarly, the second deviation calculator 47q subtracts the q-axis current Iq from the q-axis command current Iq* to calculate a current deviation ΔIq between the q-axis current Iq and the q-axis command current Iq*.

The first PID controller 48d calculates a d-axis voltage base Vdb* in accordance with a predetermined proportional gain, a predetermined integral gain, and a predetermined derivative gain of a known proportional-integral-derivative (PID) feedback control algorithm (PID algorithm) using the current deviation ΔId as its input. That is, the d-axis voltage base Vdb* output from the first PID controller 48d serves as the base of a command value for a d-axis voltage; the command value for the d-axis voltage will be referred to as a d-axis voltage command Vd*1.

Similarly, the second PID controller 48q calculates a q-axis voltage base Vqb* in accordance with a predetermined proportional gain, a predetermined integral gain, and a predetermined derivative gain of a known PID feedback control algorithm using the current deviation ΔIq as its input. That is, the q-axis voltage base Vqb* output from the second PID controller 48q serves as the base of a command value for a q-axis voltage; the command value for the q-axis voltage will be referred to as a q-axis voltage command Vq*1, Note that a d-axis component of the three-phase voltages actually applied to the armature windings 14 likely contains (1) A voltage component proportional to a d-axis current component in the three-phase currents flowing through the respective armature windings 14

(2) A d-axis interference voltage component, such as a voltage component different from the d-axis current component or a back electromotive-force (EMF) component.

Similarly, a q-axis component of the three-phase voltages actually applied to the armature windings 14 likely contains (1) A voltage component proportional to a q-axis current component in the three-phase currents flowing through the respective armature windings 14

(2) A q-axis interference voltage component, such as a voltage component different from the q-axis current component or a back EMF component.

For addressing this circumstance, the PWM control unit 41 includes the non-interference controller 49 and the first and second correctors 50d and 50q. Specifically, the non-interference controller 49 calculates a value of the d-axis interference-voltage component, referred to as Vd0, based on the d-axis current Id and a predetermined relationship between the parameters Vd0 and Id. Similarly, the non-interference controller 49 calculates a value of the q-axis interference-voltage component, referred to as Vq0, based on the q-axis current Iq and a predetermined relationship between the parameters Vq0 and Iq.

The first corrector 50d subtracts the calculated value of the d-axis interference-voltage component Vd0 from the d-axis voltage base Vdb* to calculate the d-axis voltage command Vd*1. Similarly, the second corrector 50q subtracts the calculated value of the q-axis interference-voltage component Vq0 from the q-axis voltage base Vqb* to calculate the q-axis voltage command Vq*1.

The two-to-three phase converter 51 receives the d-axis voltage command Vd*1 and the q-axis voltage command Vq*1 obtained by the respective first and second correctors 50d and 50q. The two-to-three phase converter 51 also receives the output voltage VB of the DC power source 22 sent from the voltage sensor 22, and the electrical rotational angle θ of the d-axis of the rotor 11 sent from the rotational angle sensor 33.

Then, the two-to-three phase converter 51 converts the d- and q-axis voltage commands Vd*1 and Vq*1 in the d-q coordinate system into three-phase voltage commands, i.e. fundamental command signals, VU*1, VV*1, and VW*1 for the respective three-phases in the UVW coordinate system based on the electrical rotational angle θ of the rotor 11 and a predetermined relationship between the above parameters Vd*1, Vq*1, VU*1, VV*1, VW*1, and θ.

That is, the voltage command VU*1 represents a U-phase voltage command VU*1. The voltage command W*1 represents a V-phase voltage command VV*1. The voltage command VW*1 represents a W-phase voltage command VW*1. Each of the U-, V-, and W-phase voltage commands VU*1, VV*1, and VW*1 has a sinusoidal waveform with a base voltage of 0 V corresponding to a reference voltage of the inverter 20, i.e. the midpoint of the DC power source 22.

After the two-to-three phase conversion, the two-to-three phase converter 51 determines whether the peak amplitude of each of the U-, V-, and W-phase voltage commands VU*1, VV*1, and VW*1 is greater than half of the output voltage VB of the DC power source 22. In other words, the two-to-three phase converter 51 determines whether a modulation ratio, i.e. a modulation factor, Amp of the inverter 20 is greater than a predetermined percentage of, for example, 100 percent.

For example, the two-to-three phase converter 51 calculates the modulation ratio Amp in accordance with the following equation [1]:

$$Amp(\%) = \sqrt{(Vd*1^2 + Vq*^2)/(VB \cdot \sqrt{3/8})} \times 100 \quad [1]$$

When it is determined that the modulation ratio Amp of the inverter 20 is equal to or smaller than the predetermined percentage, the two-to-three phase converter 51 outputs the U-, V-, and W-phase voltage commands VU*1, VV*1, and VW*1 to the respective first, second, and third comparators 53U, 53V, and 53W. Otherwise, when it is determined that the modulation ratio Amp of the inverter 20 is greater than the predetermined percentage, the two-to-three phase converter 51 superimposes a higher-order harmonic voltage, such as a third-order harmonic voltage, on each of the U-, V-, and W-phase voltage commands VU*1, VV*1, and VW*1. Then, the two-to-three phase converter 51 outputs the harmonic-superimposed U-, V-, and W-phase voltage commands to the respective first, second, and third comparators 53U, 53V, and 53W as the U-, V-, and W-phase voltage commands VU*1, VV*1, and VW*1.

The carrier-signal generator 52 generates a periodic triangular carrier signal CA as an example of periodic carrier signals. The triangular carrier signal CA has (1) A peak amplitude predetermined based on the peak amplitude of each of the U-, V-, and W-phase voltage commands VU*1, VV*1, and VW*1 output from the two-to-three phase converter 51

(2) a period independent from the period of the fundamental, i.e. sinusoidal, waveform of each of the U-, V-, and W-phase voltage commands VU*1, VV*1, and VW*1.

That is, the PWM control routine according to the first embodiment is an asynchronous PWM control routine.

The first comparator 53U receives the U-phase voltage command VU*1 output from the two-to-three phase converter 51, and receives the carrier signal CA generated by the carrier-signal generator 52. Then, the first comparator 53U compares in magnitude the U-phase voltage command VU*1 with the carrier signal CA, thus outputting a duty signal gU1 representing the comparison results.

Similarly, the second comparator 53V receives the V-phase voltage command VV*1 output from the two-to-three phase converter 51, and receives the carrier signal CA generated by the carrier-signal generator 52. Then, the second comparator 53V compares in magnitude the V-phase voltage command VV*1 with the carrier signal CA, thus outputting a duty signal gV1 representing the comparison results.

Additionally, the third comparator 53W receives the W-phase voltage command VW*1 output from the two-to-three phase converter 51, and receives the carrier signal CA generated by the carrier-signal generator 52. Then, the third comparator 53W compares in magnitude the W-phase voltage command VW*1 with the carrier signal CA, thus outputting a duty signal gW1 representing the comparison results.

That is, pulse-width modulation of each of the U-, V-, and W-phase voltage commands VU*1, VV*1, and VW*1 obtains a corresponding one of the duty signals gU1, gV1, and gW1 output from a corresponding one of the first to third comparators 53U, 53V, and 53W.

Each of the duty signals gU1, gV1, and gW1 output from a corresponding one of the first to third comparators 53U, 53V, and 53W has a high level when the corresponding voltage command is equal to or higher than the carrier signal CA, or a low level when the corresponding voltage command is lower than the carrier signal CA.

The duty signals gU1, gV1, and gW1 output from the respective first to third comparators 53U, 53V, and 53W are input to the selector 44.

The selector 44 enables the duty signals gU1, gV1, and gW1 output from the respective first to third comparators 53U, 53V, and 53W to input to both the dead-time generator 55 therethrough and the respective NOT circuits 54U, 54V, and 54W when selecting the PWM control routine.

Each of the NOT circuits 54U, 54V, and 54W inverts the level, i.e., high level or low level, of a corresponding one of the duty signals gU1, gV1, and gW1 to the opposite level, thus outputting a corresponding inverted duty signal to the dead-time generator 55.

The dead-time generator 55 aims to prevent upper- and lower-arm switches of the same leg, i.e. the same phase, from being simultaneously turned on, thus preventing the DC power source 22 from being short-circuited.

Specifically, the dead-time generator 55 adjusts at least one of the duty signal gU1 for the U-phase and the corresponding inverted duty signal for the same U-phase such that they are prevented from being simultaneously high. Similarly, the dead-time generator 55 adjusts at least one of the duty signal gV1 for the V-phase and the corresponding inverted duty signal for the same V-phase such that they are prevented from being simultaneously high. Additionally, the dead-time generator 55 adjusts at least one of the duty signal gW1 for the W-phase and the corresponding inverted duty signal for the same W-phase such that they are prevented from being simultaneously high. The duty signals gU1, gV1, and gW1 and their inverted signals, which are adjusted by the dead-time generator 55, are input to the gate driver 56.

The gate driver 56 outputs the duty signals gU1, gV1, and gW1 to the gates of the respective upper-arm switches SUp, SVp, and SWp as the drive signals gUp, gVp, and gWp. The gate driver 56 also outputs the inverted signals of the respective duty signals gU1, gV1, and gW1 to the gates of the respective lower-arm switches SUn, SVn, and SWn as the drive signals gUn, gVn, and gWn.

The above PWM control routine carried out by the PWM control unit 41 enables the d- and q-axis currents Id and Iq in the d-q coordinate system, which are based on the measured instantaneous values of the three-phase currents IU, IV, and IW in the UVW coordinate system, to follow the d- and q-axis command currents Id* and Iq*, which are calculated based on the command torque T*.

Rectangular-Pulse Control Routine

The rectangular-pulse control unit 42 functionally includes three-to-two phase converter 45, a torque estimator 57, a deviation calculator 58, a voltage-phase calculator 59, and a duty-signal generator 60. Note that a dashed rectangular block, to which reference numeral 42 is assigned, represents the rectangular-pulse control unit 42. Because the PWM control unit 41 and the rectangular-pulse control unit 42 share the three-to-two phase converter 45, the three-to-two phase converter 45 is excluded from the dashed rectangular block 42.

The three-to-two phase converter 45 samples the instantaneous value of the U-phase current IU measured by the current sensor 31 at each of predetermined phases of the U-phase current IU. Similarly, the three-to-two phase converter 45 samples the instantaneous value of the V-phase current IV measured by the current sensor 31 at each of the predetermined phases of the V-phase current IV. Additionally, the three-to-two phase converter 45 samples the instantaneous value of the W-phase current IW measured by the current sensor 31 at each of the predetermined phases of the W-phase current IW. The three-to-two phase converter 45 also receives the electrical rotational angle θ of the d-axis of the rotor 11 sent from the rotational angle sensor 33.

Then, the three-to-two phase converter 45 converts the instantaneous values of the three-phase currents IU, IV, and IW into the d- and q-axis currents Id and Iq. After the conversion, the three-to-two phase converter 45 serves as a low-pass filter that eliminates high-frequency components, which are higher than a predetermined threshold frequency, from the d- and q-axis currents Id and Iq. The three-to-two phase converter 45 outputs the d- and q-axis currents Id and Iq, from which the high-frequency components have been eliminated, to the torque estimator 57. How the three-to-two phase converter 45 in the rectangular-pulse control routine obtains the instantaneous values of the three-phase currents IU, IV, and IW measured by the current sensor 31 will be described later.

The torque estimator 57 receives the d- and q-axis currents Id and Iq output from the three-to-two phase converter 45, and calculates, based on the d- and q-axis currents Id and Iq, estimated torque Te as an estimated value of torque actually created by the motor-generator 10.

For example, the torque estimator 57 calculates the estimated torque Te in accordance with the following equation [2]:

$$Te = p[\phi \cdot Iq + (Ld - Lq)Id \cdot Iq] \quad [2]$$

Where p represents the number of pole pairs of the rotor 11 of the motor-generator 10, φ represents an induced voltage constant, i.e. a back electromotive force constant, of the motor-generator 10, Ld represents the inductance in the d-axis, and Lq represents the inductance in the q-axis.

The deviation calculator 58 subtracts the estimated torque Te from the command torque T* to calculate a torque deviation ΔT between the estimated torque Te and the command torque T*.

The voltage-phase calculator 59 calculates, based on the electrical rotational angle θ of the rotor 11, a rotational speed FR or an electrical angular velocity ω of the rotor 11 of the motor-generator 10. Then, the voltage-phase calculator 59 calculates a manipulated variable α* of the phase of an output voltage vector of the inverter 20 in the d-q coordinate system as a function of the torque deviation ΔT and the rotational speed FR of the motor-generator 10. That is, the manipulated variable α* of the phase of an output voltage vector of the inverter 20 is configured to feedback control the estimated torque Te to match with the command torque T*. The manipulated variable α* of the phase of the output voltage vector of the inverter 20 in the d-q coordinate system will be referred to as a voltage-phase manipulated variable α* hereinafter.

For example, the voltage-phase calculator 59 calculates the voltage-phase manipulated variable α* in accordance with a predetermined relationship between the above parameters α*, ΔT, and FR.

Note that the phase of the output voltage vector of the inverter 20, which will be referred to as a voltage phase, is defined such that a counter clockwise rotational direction from the positive side of the d-axis toward the positive side of the q-axis in the d-q coordinate system represents the positive direction of the voltage phase. For example, the voltage-phase calculator 59 advances, in accordance with the definition of the voltage phase, the voltage-phase manipulated variable α* when the estimated torque Te is lower than the command torque T*. The voltage-phase calculator 59 also delays, in accordance with the definition of the voltage phase, the voltage-phase manipulated variable α* when the estimated torque Te is lower than the command torque T*.

The duty-signal generator 60 generates a duty signal gU2 for the U-phase, a duty signal gV2 for the V-phase, and a duty signal gW2 for the W-phase according to the electrical rotational angle θ of the rotor 11 and the voltage-phase manipulated variable α*. That is, each of the duty signals gU2, gV2, and gW2 aims to control the phase of a corresponding rectangular pulse having an on duration, i.e. a high-level duration, of 180 degrees in electrical angle.

The duty signals gU2, gV2, and gW2 output from the duty-signal generator 60 are input to the selector 44.

The selector 44 enables the duty signals gU2, gV2, and gW2 output from the duty-signal generator 60 to input to both the dead-time generator 55 therethrough and the respective NOT circuits 54U, 54V, and 54W when selecting the rectangular-pulse control routine.

Each of the NOT circuits 54U, 54V, and 54W inverts the level, i.e., high level, of a corresponding one of the duty signals gU2, gV2, and gW2 to the opposite level, thus outputting a corresponding inverted duty signal to the dead-time generator 55.

The operations of the dead-time generator 55 and the gate driver 56 in the rectangular-pulse control routine are substantially identical to those of the dead-time generator 55 and the gate driver 56 when the duty signals gU1, gV1, and gW1 should be replaced with the duty signals gU2, gV2, and gW2.

Switching Control Routine

Figure 3:
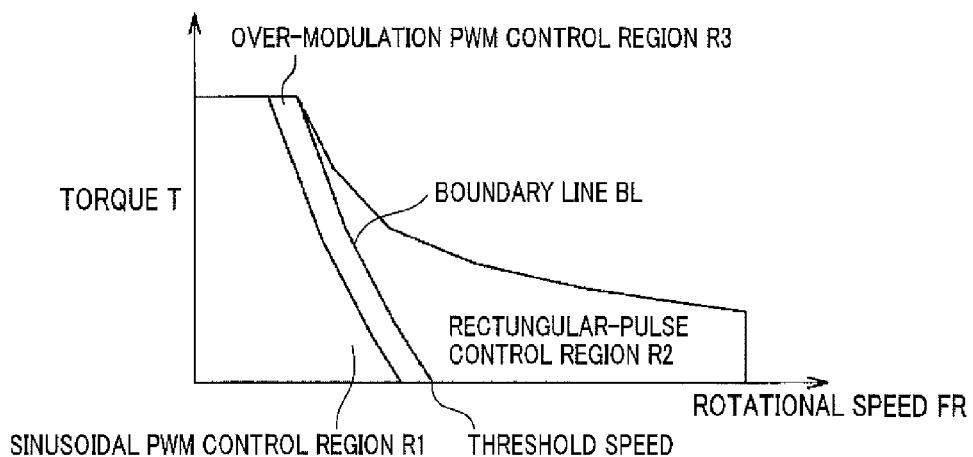
FIG. 3 is a graph schematically illustrating a relationship between a command torque, a rotational speed of a rotor illustrated in FIG. 1, a sinusoidal PWM control region, and a rectangular-pulse control region according to the first embodiment.

FIG. 3 is a graph illustrating a relationship between
(1) The command torque T*,
(2) The rotational speed FR of the rotor 11
(3) A sinusoidal PWM control region R1 representing that, when the point at the intersection of a value of the command torque T* and a value of the rotational speed FR of the rotor 11 is located within the sinusoidal PWM control region R1, the selector 44 selects the PWM control routine
(4) A rectangular-pulse control region R2 representing that, when the point at the intersection of a value of the command torque T* and a value of the rotational speed FR of the rotor 11 is located within the rectangular-pulse control region R2, the selector 44 selects the rectangular-pulse control routine.

Specifically, information I1 indicative of the graph illustrated in FIG. 3 is stored in the memory 40b of the control apparatus 40. The selector 44 selects, based on the information I1, the PWM control routine when at least a value of the rotational speed FR of the rotor 11 is set to be equal to or lower than a predetermined threshold speed. In other words, the selector 44 selects, based on the information I1, the PWM control routine when at least a value of the rotational speed FR of the rotor 11 is located within a low rotational-speed range that is defined to be equal to or lower than the predetermined threshold speed.

In contrast, the selector 44 selects, based on the information I1, the rectangular-pulse control routine at least a value of the rotational speed FR of the rotor 11 is set to be higher than the predetermined threshold speed. In other words, the selector 44 selects, based on the information I1, the rectangular-pulse control routine when at least a value of the rotational speed FR of the rotor 11 is located within a high rotational-speed range that is defined to be higher than the predetermined threshold speed.

Note that a boundary line BL between the sinusoidal PWM control region R1 and the rectangular-pulse control region R2 is defined such that, the higher the command torque T* is, the lower the rotational speed FR of the rotor 11 is, and the lower the command torque T* is, the higher the rotational speed FR of the rotor 11 is. Why the selector 44 is configured to switch control of the motor-generator 10 from the PWM control routine to the rectangular-pulse control routine is, for example, as follows.

As described above, the reference voltage of the inverter 20 corresponds to the midpoint of the DC power source 22, so that the inverter 20 is capable of outputting a phase voltage within the range between the upper limit of +VB/2 and the lower limit of −VB/2 inclusive.

For this reason, if the peak value, i.e. peak amplitude, of each of the U-, V-, and W-phase voltage commands VU*1, VV*1, and VW*1 is greater than half of the output voltage VB of the DC power source 22, in other words, the modulation ratio Amp of each of the U-, V-, and W-phase voltage commands VU*1, VV*1, and VW*1 is greater than 100 percent, the PWM control routine could not match the voltage applied to the corresponding phase armature winding 14 with each of the U-, V-, and W-phase voltage commands VU*1, W*1, and VW*1.

Figure 4A:
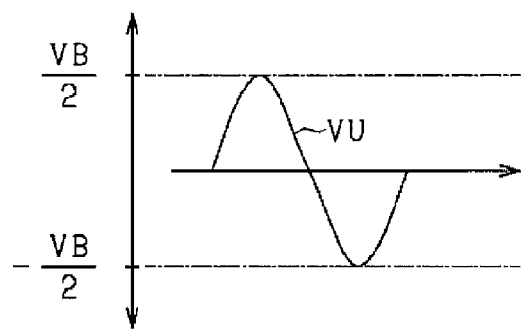
FIG. 4A is a graph schematically illustrating the waveform of a U-phase voltage when a modulation ratio is set to 100 percent

FIG. 4A schematically illustrates the waveform of the U-phase voltage VU applied to the U-phase armature winding 14 having an upper peak of +VB/2 and a lower peak of −VB/2 when the modulation ratio Amp is set to 100 percent.

In contrast, as described above, superimposing harmonic voltages on each of the U-, V-, and W-phase voltage commands VU*1, VV*1, and VW*1 in the PWM control routine enables the modulation ratio Amp to be higher than 100 percent. For example, superimposing third-order harmonic voltages on each of the U-, V-, and W-phase voltage commands VU*1, VV*1, and VW*1 in the PWM control routine enables the modulation ratio Amp to be set to 115 percent.

Figure 4B:
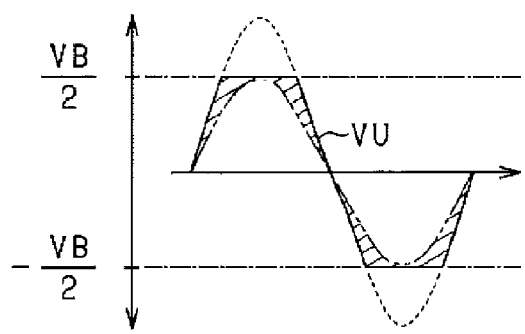
FIG. 4B is a graph schematically illustrating the waveform of the U-phase voltage when the modulation ratio is set to be higher than 100 percent.

FIG. 4B schematically illustrates the waveform of the U-phase voltage VU applied to the U-phase armature winding 14 when the modulation ratio Amp is set to be higher than 100 percent. FIG. 4B shows that the U-phase voltage VU differs in waveform from a sinusoidal waveform because the amplitude of the U-phase voltage VU is limited to half of the output voltage VB of the DC power source 22. However, the U-phase voltage VU illustrated in FIG. 4B has a higher utilization factor of the output voltage VB of the DC power source 22 than the U-phase voltage VU illustrated in FIG. 4A has by hatched regions illustrated in FIG. 4B.

That is, the two-to-three phase converter 51 superimposes a higher-order harmonic voltage, such as a third-order harmonic voltage, on each of the U-, V-, and W-phase voltage commands VU*1, VV*1, and VW*1 when the modulation ratio Amp of the inverter 20 is greater than 100 percent. This enables the effective value of each of the U-, V-, and W-phase voltages VU; VV, and VW in the case illustrated in FIG. 4B to be greater than the effective value of each of the U-, V-, and W-phase voltages VU, VV and VW in the case illustrated in FIG. 4A. Continuously performing the PWM control routine using a higher-order harmonic voltage enables three-phase alternating currents IU, IV, and IW, which are determined based on the d- and q-axis command currents Id* and Iq* to flow through the respective U-, V-, and W-phase armature windings 14 even if the peak value of each of the U-, V-, and W-phase voltage commands VU*1, VV*1, and VW*1 is higher than +VB/2.

A predetermined region R3 in the sinusoidal PWM control region R1 represents an over-modulation PWM control region R3. The over-modulation PWM control region R3 shows that, when the modulation ratio Amp is set to be higher than 100 percent and lower than 127 percent described later, the selector 44 selects the PWM control routine and the PWM control routine superimposes a higher-order harmonic voltage on each of the U-, V-, and W-phase voltage commands VU*1, VV*1, and VW*1.

An increase of the amplitude of each of the U-, V-, and W-phase voltage commands VU*1, VV*1, and VW*1 results in the corresponding phase voltage finally having a rectangular-pulsed waveform that alternately rises to +VB/2 and falls to −VB/2 in a predetermined cycle that is identical to the cycle of the corresponding one of the U-, V-, and W-phase voltage commands VU*1, W*1, and VW*1.

Note that skilled persons in the art know that an increase in the modulation ratio Amp over $4/\pi$ percent may reduce the controllability of the PWM control routine. Thus, the PWM control routine can be switched to the rectangular-pulse control routine when the amplitude of each of the U-, V-, and W-phase voltage commands VU*1, VV*1, and VW*1 reaches 127 percent of the output voltage VB of the DC power source 22; 127 percent is substantially equal to, or more strictly speaking, slightly lower than $4/\pi$ percent.

Figure 5:
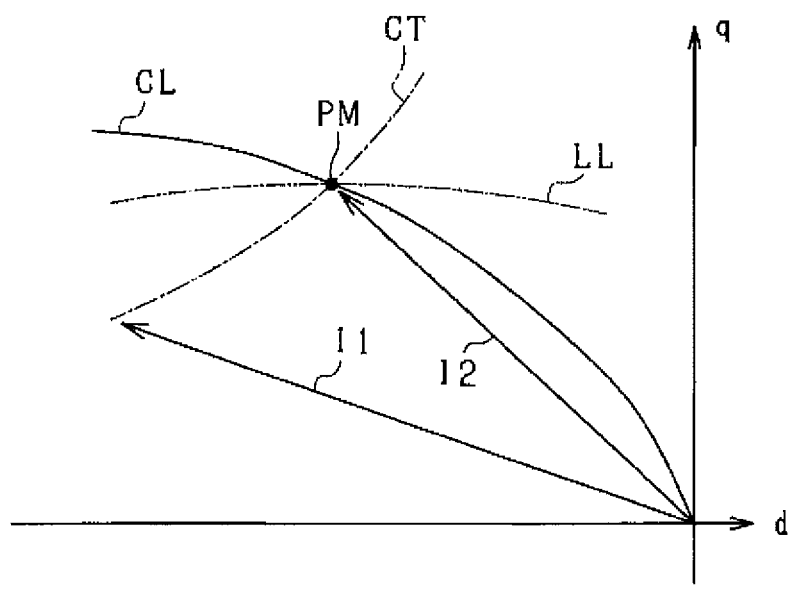
FIG. 5 is a graph schematically illustrating a command-current curve used by a PWM control routine, a current limitation curve, and a constant torque curve in a d-q coordinate system according to the first embodiment.

FIG. 5 schematically illustrates a command-current curve CL used by the PWM control routine, a current limitation curve LL, and a constant torque curve CT in the d-q coordinate system.

The command-current curve CL, which is illustrated as a solid curve, shows a curve drawn by a current vector defined based on the d- and q-axis command currents Id* and Iq* generated by the command-current generator 46; the current vector passes through the origin of the d-q coordinate system. That is, the command-current generator 46 is configured to select one of command-current curves CL, which enable the command torque T* to be obtained, according to requirements for control of the motor-generator 10, For example, the command-current generator 46 according to the first embodiment is configured to select one of the command-current curves CL; the selected command-current curve CL enables the command torque T* to be achieved by a minimum length of the current vector.

The constant torque curve CT, which is illustrated as a dashed-dotted curve, represents constant torque at any length of the current vector.

The current limitation curve LL, which is illustrated as a two-dot chain curve, shows a limitation line representing the limitations of the point indicated by the current vector defined based on the d- and q-axis command currents Id* and Iq* in the d-q coordinate system. Specifically, the point indicated by the current vector should be limited within the current limitation curve LL. The output voltage VB of the DC power source 22 and the rotational speed FR of the rotor 11 determine the current limitation curve LL. Thus, the length of an actual current vector defined based on actual d- and q-axis currents Id and Iq, which respectively follow the d- and q-axis command currents Id* and Iq* generated by the command-current generator 46, should be limited within the length of a reference current vector 12 that passes through the intersection point PM of the command-current curve CL and the current limitation curve LL. Thus, the PWM control routine can be switched to the rectangular-pulse control routine when the point indicated by the current vector defined based on the d- and q-axis command currents Id* and Iq* reaches the intersection point PM of the command-current curve CL and the current limitation curve LL.

On the other hand, the actual d- and q-axis currents Id and Iq in the rectangular-pulse control routine do not match with the respective actual d- and q-axis currents Id and Iq, which respectively follow the B- and q-axis command currents Id* and Iq* restricted by the command-current curve CL. Specifically, let us assume a case where a value of the command torque T* in the PWM control routine is equal to a value of the command torque T* in the rectangular-pulse control so that an actual value of output torque T of the motor-generator 10 obtained by the PWM control routine is equal to an actual value of the output torque T of the motor-generator 10 obtained by the rectangular-pulse control routine. In this case, actual d- and q-axis currents Id and Iq in the PWM control routine, which are required to achieve the value of the command torque T*, may differ from actual d- and q-axis currents Id and Iq in the rectangular-pulse control routine, which are required to achieve the value of the command torque T*. For example, even if a current vector I1 in the rectangular-pulse control routine and the current vector 12 in the PWM control routine generate the same value of the output torque T of the motor-generator 10, the current vector I1 clearly differs from the current vector 12.

In this regard, if the length of a current vector defined based on actual d- and q-axis currents Id and Iq, which respectively follow the d- and q-axis command currents Id* and Iq* generated by the command-current generator 46, is equal to or lower than the length of the reference current vector 12, the PWM control routine can generate a value of the output torque T; the value of the output torque T is generated by the rectangular-pulse control routine.

The switching control unit 43 determines whether a control-routine switching instruction is externally input thereto. For example, the control system CS1 sends such a control-routine switching instruction according to, for example, the modulation ratio Amp or the rotational speed FR of the rotor 11.

As described above, the rectangular-pulse control routine obtains the instantaneous value of each of the three-phase currents IU, IV, and IW measured by the current sensor 31 at each of the predetermined phases of the corresponding phase current. Then, the rectangular-pulse control routine calculates, based on the measured values of the three-phase currents IU, IV, and IW, the estimated torque Te. Based on the estimated torque Te, the rectangular-pulse control routine controls the output torque T of the motor-generator 10.

When switching the PWM control routine to the rectangular-pulse control routine, a known conventional control apparatus stops performing any feedback control routine until the known conventional control apparatus obtains the instantaneous values of the three-phase currents IU, IV, and IW measured by the current sensor 31. This may reduce the torque responsivity of the motor-generator 10 with respect to the input of the command torque T*.

Figure 6:
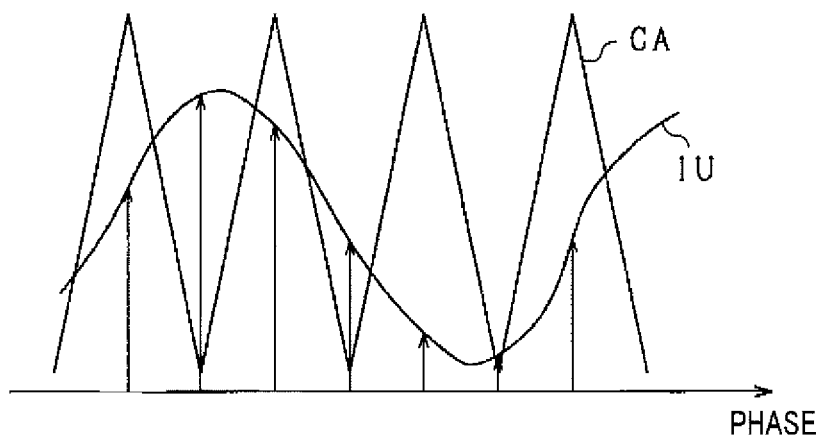
FIG. 6 is a graph schematically illustrating sampling timings of a U-phase current in the PWM control routine according to the first embodiment.
Figure 7:
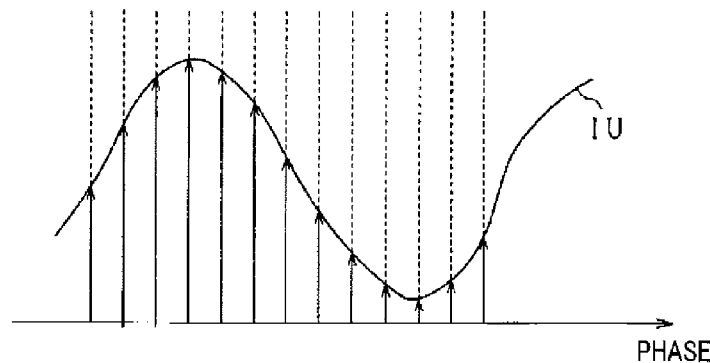
FIG. 7 is a graph schematically illustrating sampling timings of a U-phase current in the rectangular-pulse control routine according to the first embodiment.
Figure 8:
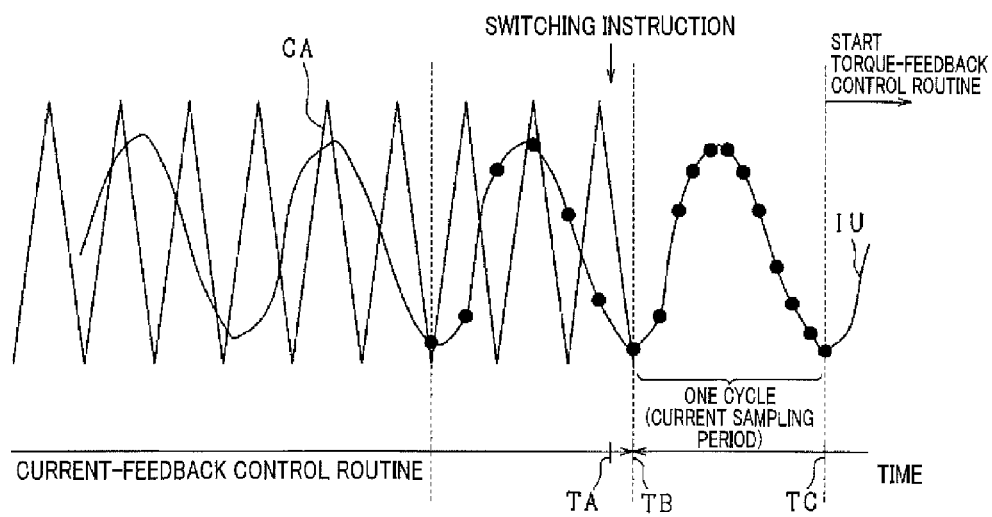
FIG. 8 is a timing chart schematically illustrating how a conventional control apparatus switches control of a motor-generator from the PWM control routine to the rectangular-pulse control routine based on a triangular carrier signal and a U-phase current.

The following describes the reduction of the torque responsivity of the motor-generator 10 controlled by the conventional control apparatus with reference to FIGS. 6 to 8.

Referring to FIG. 6, the PWM control routine obtains the measured values of the three-phase currents IU, IV, and IW when the phase of the triangular carrier signal CA becomes each of zero and 180 electrical degrees. In other words, the PWM control routine obtains the measured values of the three-phase currents IU, IV, and IW in synchronization with each of positive and negative peaks of the triangular carrier signal CA. Then, the three-to-two phase converter 45 converts the measured values of the three-phase currents IU, IV, and IW into the d-axis current Id and the q-axis current Iq.

In contrast, referring to FIG. 7, the rectangular-pulse control routine obtains, in each cycle of the U-phase current IU, a measured value of the U-phase current IU at each of the predetermined phases of the U-phase current ILL. Specifically, the rectangular-pulse control routine obtains, in each cycle of the U-phase current IU, measured values of the U-phase current IU at each of 0, 30, 60, . . . , 300, and 330 electrical degrees of the electrical rotational angle θ of the rotor 11. Similarly, the rectangular-pulse control routine obtains, in each cycle of the V-phase current IV, measured values of the V-phase current IV at each of the predetermined phases of the V-phase current IV, and obtains, in each cycle of the W-phase current IW, measured values of the W-phase current IW at each of the predetermined phases of the W-phase current IW.

Because the rectangular-pulse control routine outputs a rectangular pulse voltage that differs from a sinusoidal AC voltage output from the PWM control routine, the output rectangular pulse voltage includes high-order harmonic components. Thus, as described above, the three-to-two phase converter 45 serves as a low-pass filter to eliminate the high-order harmonic components as the high-frequency components from the d- and q-axis currents Id and Iq. Then, the torque estimator 57 estimates the estimated torque Te according to the d- and q-axis currents Id and Iq, from which the high-order harmonic components have been eliminated. The d- and q-axis currents Id and Iq, from which the high-order harmonic components have been eliminated, will be referred to as filtered d- and q-axis currents Id and Iq hereinafter.

Note that the three-to-two phase converter 45 serving as a low-pass filter has a predetermined time constant that is set to one cycle of the three-phase currents IU, IV, and IW, i.e. one cycle of the three-phase voltage commands VU*1, VV*1, and VW*1.

FIG. 8 schematically illustrates how the conventional control apparatus switches control of the motor-generator 10 from the PWM control routine, i.e. current feedback routine, to the rectangular-pulse control routine, i.e. torque feedback control routine, based on the carrier signal CA and a U-phase current IU When it is determined that a control-routine switching instruction is externally input to the conventional control apparatus at time TA, the conventional control apparatus switches control of the motor-generator 10 from the PWM control routine to the rectangular-pulse control routine at time TB synchronized with a closest negative peak of the carrier signal CA, At the time TB, because the conventional control apparatus does not obtain filtered d- and q-axis currents Id and Iq, the conventional control apparatus has difficulty calculating the estimated torque Te at the time TB.

Thus, the conventional control apparatus is required to obtain measured values of the U-, V-, and W-phase currents IU, IV, and IW in order to obtain filtered d- and q-axis currents Id and Iq for a predetermined period following the time TB. The length of the predetermined period depends on the time constant of the low-pass filter function of the three-to-two phase converter 45. Specifically, the conventional control apparatus samples measured values of each of the U-, V-, and W-phase currents IU, IV, and IW in one cycle of the corresponding phase current. The conventional control apparatus cannot perform the torque-feedback control based on the estimated torque Te because it has not completed calculation of the estimated torque Te yet. The conventional control apparatus therefore calculates the phase of the output voltage vector of the inverter 20 in the d-q coordinate system in accordance with the d- and q-axis voltage commands Vd*1 and Vq*1 used as target d- and q-axis voltages in the PWM control routine. Then, the conventional control apparatus uses the calculated phase of the output voltage vector of the inverter 20 as the manipulated variable α* of the phase of the output voltage vector of the inverter 20 in the rectangular-pulse control routine.

That is, the conventional control apparatus fails to calculate the estimated torque Te during one cycle of each of the U-, V-, and W-phase currents IU, IV, and IW from the time TB to time TC although control of the motor-generator 10 has been switched from the PWM control routine to the rectangular-pulse control routine. This may result in reduction of the torque responsivity of the motor-generator 10 with respect to the input of the command torque T*.

In view of these circumstances, when switching the PWM control routine to the rectangular-pulse control routine, the control apparatus 40 obtains, in one cycle of the U-phase current IU, a measured value of the U-phase current IU at each of the predetermined phases of the U-phase current IU while performing the PWM control routine. The predetermined phases of the U-phase current IU respectively correspond to 0, 30, 60, . . . , 300, and 330 degrees of the rotational angle θ of the rotor 11.

In other words, the control apparatus 40 synchronizes phases of the U-phase current IU at which corresponding measured values of the U-phase current IU are to be obtained in the PWM control routine with phases of the U-phase current IU at which corresponding measured values of the U-phase current IU are to be obtained in the rectangular-pulse control routine. The control apparatus 40 obtains, in one cycle of the V-phase current IV, a measured value of the V-phase current IV at each of the predetermined phases while performing the PWM control routine. The predetermined phases of the U-phase current IU respectively correspond to 0, 30, 60, . . . , 300, and 330 degrees of the rotational angle θ of the rotor 11. In addition, the control apparatus 40 obtains, in one cycle of the W-phase current IW, a measured value of the W-phase current IW at each of the predetermined phases while performing the PWM control routine. The predetermined phases of the U-phase current IU respectively correspond to 0, 30, 60, . . . , 300, and 330 degrees of the rotational angle θ of the rotor 11.

Then, the control apparatus 40 performs the rectangular-pulse control routine based on the obtained measured values of the three-phase currents IU, IV, and IW That is, the three-to-two phase converter 45 converts the measured values of the three-phase currents IU, IV, and IW into the d-axis current Id and the q-axis current Iq, and thereafter, filters the d-axis current Id and the q-axis current Iq. Then, the torque estimator 57 calculates the estimated torque Te according to the filtered d- and q-axis currents Id and Iq. After calculation of the estimated torque Te, the rectangular-pulse control unit 42 performs the torque-feedback control based on the estimated torque Te set forth above in response to when starting the rectangular-pulse control routine. This aims to prevent the torque responsivity of the motor-generator 10 with respect to the input of the command torque T* from decreasing. That is, this aims to maintain the torque responsivity of the motor-generator 10 with respect to the input of the command torque T* at a higher level.

For example, the control system CS1 outputs a current-sampling synchronization instruction to the control apparatus 40 before sending the control-routine switching instruction to the control apparatus 40. The current-sampling synchronization instruction instructs the control apparatus 40 to synchronize phases of each phase voltage command VU*1, VV*1, and VW*1 at which corresponding measured values of the corresponding phase current are to be obtained in the PWM control routine with phases of the corresponding phase current at which corresponding measured values of the corresponding phase current are to be obtained in the rectangular-pulse control routine. The phases of each phase voltage command VU*1, VV*1, and VW*1 at which corresponding measured values of the corresponding phase current are to be obtained in the PWM control routine will be referred to as first current-sampling phases in the PWM control routine. The phases of the corresponding phase current at which corresponding measured values of the corresponding phase current are to be obtained in the rectangular-pulse control routine will be referred to as second current-sampling phases in the rectangular-pulse control routine.

When receiving the current-sampling synchronization instruction, the switching control unit 43 performs a current-sampling synchronization task. The current-sampling synchronization task synchronizes the first current-sampling phases in the PWM control routine with the second current-sampling phases in the rectangular-pulse control routine. Specifically, the switching control unit 43 sets the frequency of the carrier signal CA to n times the frequency of each phase current IU, IV, and IW; n is an integer equal to or higher than 2. The ratio n of the frequency of the carrier signal CA to the frequency of each phase current IU, IV, and IW is previously set based on the phases of each phase current IU, IV, and IW at which measured values of the corresponding phase current are to be obtained in the rectangular-pulse control routine.

For example, the rectangular-pulse control unit 42 is configured to obtain measured values of each phase current IU, IV, and IW m times in each cycle of the corresponding phase current; m is an integer equal to or higher than 2. The rectangular-pulse control unit 42 according to the first embodiment is configured to obtain measured values of each phase current IU, IV, and IW 12 times for each cycle of the corresponding phase current. In other words, the rectangular-pulse control unit 42 is configured to obtain measured values of each phase current IU, IV, and IW every 30 electrical degrees in each cycle of the corresponding phase current.

In contrast, the PWM control unit 41 is configured to obtain a measured value of each phase current IU, IV, and IW in synchronization with each of positive and negative peaks of the carrier signal CA. Thus, setting the ratio n to 6 corresponding to m/2 enables measured values of each phase current IU, IV, and IW to be obtained at respective predetermined phases of 30, 60, . . . , 300, 330, and 360 of the electrical rotational angle θ of the rotor 11.

That is, because the rectangular-pulse control unit 42 is configured to obtain measured values of each phase current IU, IV, and IW m times in each cycle of the corresponding phase current; m is an integer equal to or higher than 2, the ratio n is set to m/2 according to the first embodiment.

In addition, the switching control unit 43 synchronizes the first current-sampling phases in the PWM control routine with the second current-sampling phases in the rectangular-pulse control routine in response to receiving the current-sampling synchronization instruction before switching the PWM control routine to the rectangular-pulse control routine. This enables the phases of the measured values of each phase current IU, IV, and IW obtained in the PWM control routine to match with the phases of the measured values of the corresponding phase current obtained in the rectangular-pulse control routine.

Figure 9:
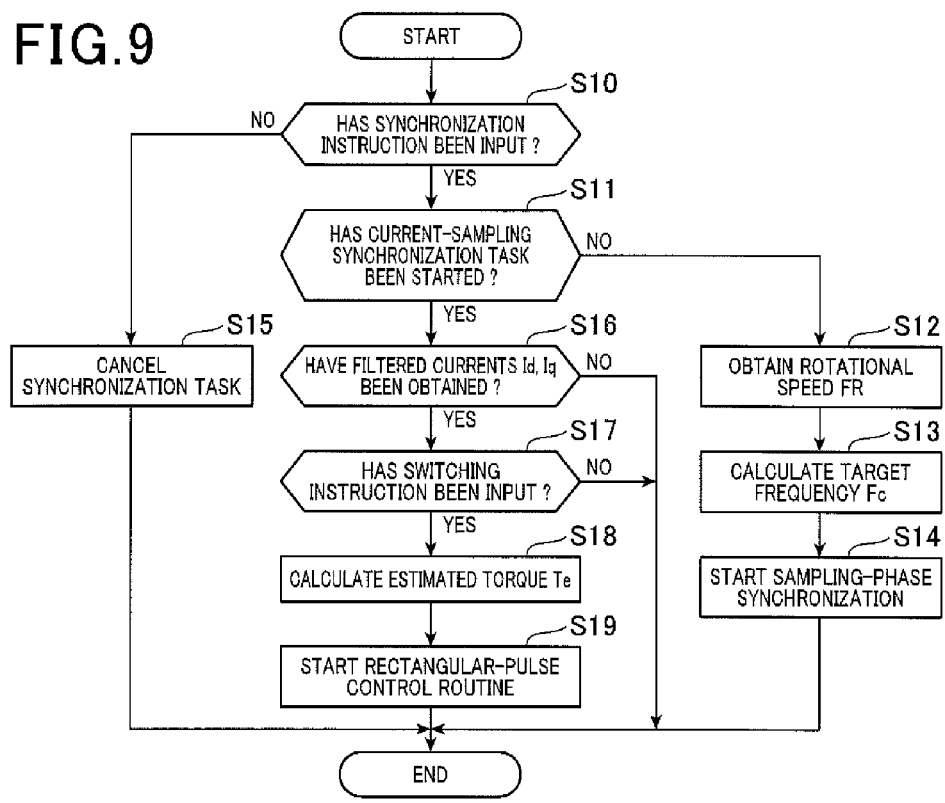
FIG. 9 is a flowchart schematically illustrating a switching control routine carried out by a control apparatus illustrated in FIG. 1.

The following describes the switching control routine for switching the PWM control routine to the rectangular-pulse control routine carried out by the control apparatus 40 for every control period while the control apparatus 40 is performing the PWM control routine with reference to FIG. 9. Note that the selector 44 selects the PWM control routine so that the duty signals gU1, gV1, and gW1 are selected to input to both the dead-time generator 55 therethrough and the respective NOT circuits 54U, 54V, and 54W while the control apparatus 40 is performing the PWM control routine.

When starting the switching control routine, the control apparatus 40 determines whether the current-sampling synchronization instruction has been input thereto in step S10. Upon determining that the current-sampling synchronization instruction has been input to the control apparatus 40 (YES in step S10), the control apparatus 40 determines whether the current-sampling synchronization task has been started thereby in step S11.

Upon determining that the current-sampling synchronization task has not been started (NO in step S11), the control apparatus 40 performs the current-sampling synchronization task. Specifically, the control apparatus 40 calculates, on the basis of the electrical rotational angle θ of the rotor 11, the rotational speed FR of the rotor 11 in step S12, For example, the control apparatus 40 differentiates the electrical rotational angle θ of the rotor 11 with respect to time to calculate the rotational speed FR of the rotor 11 accordingly in step S12. The rotational speed FR of the rotor 11 calculated based on the temporal differentiation of the electrical rotational angle θ of the rotor 11 shows the frequency of each phase current IU, IV, and IW, i.e. each phase voltage command VU*1, VV*1, and VW*1.

Next, the control apparatus 40 calculates, based on the rotational speed FR of the rotor 11, a target frequency Fc for the carrier signal CA in step S13. Specifically, the control apparatus 40 multiplies the rotational speed FR of the rotor 11 by m/2, thus calculating the target frequency Fc for the carrier signal CA as expressed by the following equation [3]:

$$Fc=FR \cdot m/2 \quad [3]$$

Following the operation in step S13, the control apparatus 40 sets the frequency of the carrier signal CA to the target frequency Fc in step S14. This starts synchronization of the phases of the measured values of each phase current IU, IV, and IW to be obtained in the PWM control routine with the phases of the measured values of the corresponding phase current to be obtained in the rectangular-pulse control routine. The control apparatus 40 terminates the switching control routine after completion of the operation in step S14. Completion of the operation in step S14 causes the three-to-two phase converter 45 to sample measured values of each phase current IU, IV, and IW in the PWM control routine in synchronization with the positive and negative peaks of the carrier signal CA having the target frequency Fc.

Otherwise, upon determining that the current-sampling synchronization instruction has not been input to the control apparatus 40 (NO in step S10), the control apparatus 40 performs an operation in step S15. Specifically, the control apparatus 40 terminates the switching control routine if the current-sampling synchronization task is not performed, or cancels the current-sampling synchronization task and terminates the switching control routine if the current-sampling synchronization task is performed in step S15.

In step S11, upon determining that the current-sampling synchronization task has been started (YES in step S11), the control apparatus 40 determines whether the filtered d- and q-axis currents Id and Iq have been obtained by the three-to-two phase converter 45 and the torque estimator 57 in step S16. Upon determining that the filtered d- and q-axis currents Id and Iq have not been obtained yet by the three-to-two phase converter 45 and the torque estimator 57 (NO in step S16), the control apparatus 40 terminates the switching control routine.

Otherwise, upon determining that the filtered d- and q-axis currents Id and Iq have been obtained by the three-to-two phase converter 45 and the torque estimator 57 (YES in step S16), the control apparatus 40 determines whether the control-routine switching instruction has been input thereto in step S17.

Upon determining that the control-routine switching instruction has not been input to the control apparatus 40 (NO in step S17), the control apparatus 40 terminates the switching control routine.

Otherwise, upon determining that the control-routine switching instruction has been input to the control apparatus 40 (YES in step S17), the control apparatus 40 cancels the current-sampling synchronization task, and calculates the estimated torque Te in accordance with the filtered d- and q-axis currents Id and Iq in step S18. Following the operation in step S18, the control apparatus 40 switches the PWM control routine to the rectangular-pulse control routine, and starts the rectangular-pulse control routine in step S19. Specifically, the switching control unit 43 outputs a control signal to switch the PWM control routine to the rectangular-pulse control routine to the selector 44, so that the selector 44 selects the duty signals gU2, gV2, and gW2 to input to both the dead-time generator 55 therethrough and the respective NOT circuits 54U, 54V, and 54W.

After completion of the operation in step S19, the control apparatus 40 terminates the switching control routine.

Figure 10:
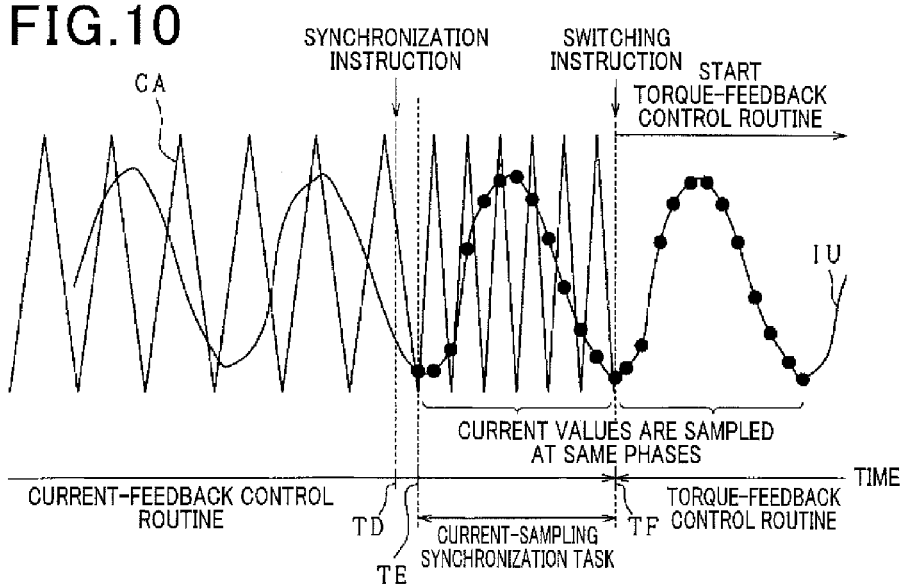
FIG. 10 is a timing chart schematically illustrating how the control apparatus according to the first embodiment switches control of the motor-generator from the PWM control routine to the rectangular-pulse control routine based on a triangular carrier signal and a U-phase current.

FIG. 10 is a timing chart schematically illustrating specific timings of selected operations of the switching control routine.

After the current-sampling synchronization instruction is input to the control apparatus 40 at time TD, the current-sampling synchronization task is started at time TE that is synchronized with a closest positive or negative peak of the carrier signal CA (see steps S10 to S14). That is, the current-sampling synchronization task obtains, in one cycle of each phase current IU, IV, and IW, a measured value of the corresponding phase current at each of the predetermined phases (0, 30, 60, 300, and 330 degrees) while performing the PWM control routine from the time TE to time TF. The time TF represents the completion of the one cycle of each phase current IU, IV, and IW (see steps S12 to S14). The cycle of each phase current IU, IV, and IW corresponds to the time constant of the low-pass filter function of the three-to-two phase converter 45.

When the control-routine switching instruction is input to the control apparatus 40 at, for example, the time TF (see YES in step S17), the estimated torque Te is calculated in accordance with the filtered d- and q-axis currents Id and Iq (see step S18). Then, the rectangular-pulse control routine, i.e. the torque-feedback control routine, is started at the time TF (see step S19).

The following describes advantageous effects achieved by the control system CS according to the first embodiment.

The control apparatus 40 of the control system CS obtains measured values of the three-phase currents IU, IV, and IW, which are used to perform the rectangular-pulse control routine, while performing the PWM control routine. This configuration prevents the torque responsivity of the motor-generator 10 from decreasing when control of the motor-generator 10 is switched from the PWM control routine to the rectangular-pulse control routine.

The control apparatus 40 sets the frequency of the carrier signal CA before switching the PWM control routine to the rectangular-pulse control routine. This adjusts phases of each phase current IU, IV, and IW for current-value sampling in the PWM control routine to match with phases of the corresponding phase current IU, IV, and IW for current-value sampling in the rectangular-pulse control routine.

In other words the control apparatus 40 synchronizes phases of each phase current IU, IV, and IW for current-value sampling in the PWM control routine with phases of the corresponding phase current for current-value sampling in the rectangular-pulse control routine.

Then, the control apparatus 40 starts the rectangular-pulse control routine based on measured values of each phase current IU, IV, and IW sampled at the adjusted phases of the corresponding phase current.

This configuration further prevents the torque responsivity of the motor-generator 10 from decreasing when control of the motor-generator 10 is switched from the PWM control routine to the rectangular-pulse control routine.

Second Embodiment

Figure 11:
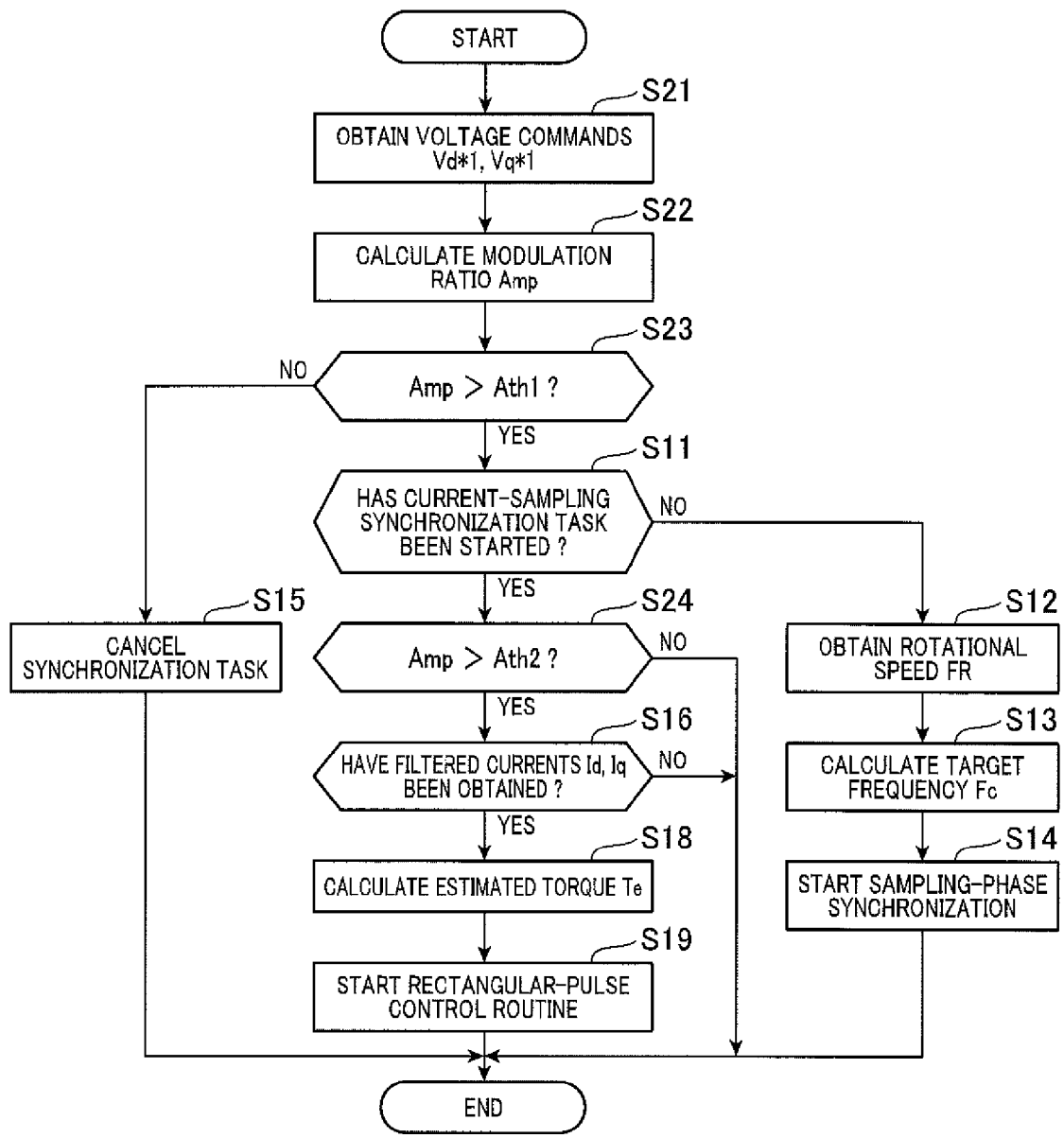
FIG. 11 is a flowchart schematically illustrating a switching control routine carried out by a control apparatus according to the second embodiment of the present disclosure.

The following describes a control system for controlling the motor-generator 10 according to the second embodiment of the present disclosure with reference to FIG. 11.

The structure and/or functions of the control system according to the second embodiment are different from the control system CS according to the first embodiment by the following points. So, the following mainly describes the different points.

The control apparatus 40 according to the second embodiment carries out a switching control routine, which differs from the switching control routine illustrated in FIG. 9. The switching control routine according to the second embodiment is configured to switch the PWM control routine to the rectangular-pulse control routine for every control period while the control apparatus 40 is performing the PWM control routine with reference to FIG. 11. Like operations of the switching control routines respectively illustrated in FIGS. 9 and 11, to which like step numbers are assigned, are omitted or simplified in description to avoid redundant description.

When starting the switching control routine according to the second embodiment, the control apparatus 40, i.e. the switching control unit 43, obtains the d- and q-axis voltage commands Vd*1 and Vq*1 in step S21, and calculates the modulation ratio Amp in accordance with the d- and q-axis voltage commands Vd*1 and Vq*1 in step S22. For example, the control apparatus 40 calculates the modulation ratio Amp of the inverter 20 in accordance with the above equation [1] in step S22.

Following the operation in step S22, the control apparatus 40 determines whether the modulation ratio Amp of the inverter 20 exceeds a predetermined modulation-ratio threshold Ath1 in step S23. For example, the modulation-ratio threshold Ath1, which is referred to simply as a threshold Ath1, is set to 115 percent.

Upon determining that the modulation ratio Amp of the inverter 20 does not exceed the threshold Ath1 (NO in step S23), the control apparatus 40 performs the above operation in step S15. Specifically, the control apparatus 40 terminates the switching control routine if the current-sampling synchronization task is not performed, or cancels the current-sampling synchronization task and terminates the switching control routine if the current-sampling synchronization task is performed in step S15.

Otherwise, upon determining that the modulation ratio Amp of the inverter 20 exceeds the threshold Ath1 (YES in step S23), the control apparatus 40 determines that execution of the current-sampling synchronization task is required. Then, the control apparatus 40 determines whether the current-sampling synchronization task has been started in step S11 set forth above.

In step S11, upon determining that the current-sampling synchronization task has not been started (NO in step S11), the control apparatus 40 performs the current-sampling synchronization task in steps S12 to S14 set forth above.

Otherwise, upon determining that the current-sampling synchronization task has been started (YES in step S11), the control apparatus 40 determines whether the modulation ratio Amp of the inverter 20 exceeds a predetermined modulation-ratio threshold Ath2 that is higher than the threshold Ath1 in step S24. For example, the modulation-ratio threshold Ath2 is set to 127 percent that is its upper limit achievable by the PWM control routine. The modulation-ratio threshold Ath2 is referred to simply as a threshold Ath2.

Upon determining that the modulation ratio Amp of the inverter 20 does not exceed the threshold Ath2 (NO in step S24), the control apparatus 40 terminates the switching control routine.

Otherwise, upon determining that the modulation ratio Amp of the inverter 20 exceeds the threshold Ath2 (YES in step S24), the control apparatus 40 determines that switching of the PWM control routine to the rectangular-pulse control routine is required. Then, the control apparatus 40 performs the operations in steps S16, S18, and S19 set forth above.

As described above, the control apparatus 40 according to the second embodiment performs the current-sampling synchronization task upon determining that the modulation ratio Amp of the inverter 20 exceeds the threshold Ath1 in place of receiving the current-sampling synchronization instruction. The current-sampling synchronization task synchronizes the phases of the measured values of each phase current IU, IV, and IW to be obtained in the PWM control routine with the phases of the measured values of the corresponding each phase current to be obtained in the rectangular-pulse control routine. Execution of the current-sampling synchronization task enables the three-to-two phase converter 45 to obtain measured values of each phase current IU, IV, and IW in the PWM control routine in synchronization with the positive and negative peaks of the carrier signal CA having the target frequency Fe.

After execution of the current-sampling synchronization task, the control apparatus 40 switches control of the motor-generator 10 from the PWM control routine to the rectangular-pulse control routine upon determining that the modulation ratio Amp of the inverter 20 exceeds the threshold Ath2 in place of receiving the control-routine switching instruction.

That is, the control apparatus 40 enables the three-to-two phase converter 45 to obtain measured values of each phase current IU, IV, and IW in the PWM control routine while performing the PWM control routine if the modulation ratio Amp is within a high modulation-ratio range that is higher than the threshold Ath2. This enables the PWM control routine for the motor-generator 10 to be switched to the rectangular-pulse control routine immediately as the modulation ratio Amp exceeds the threshold Ath2.

Third Embodiment

Figure 12:
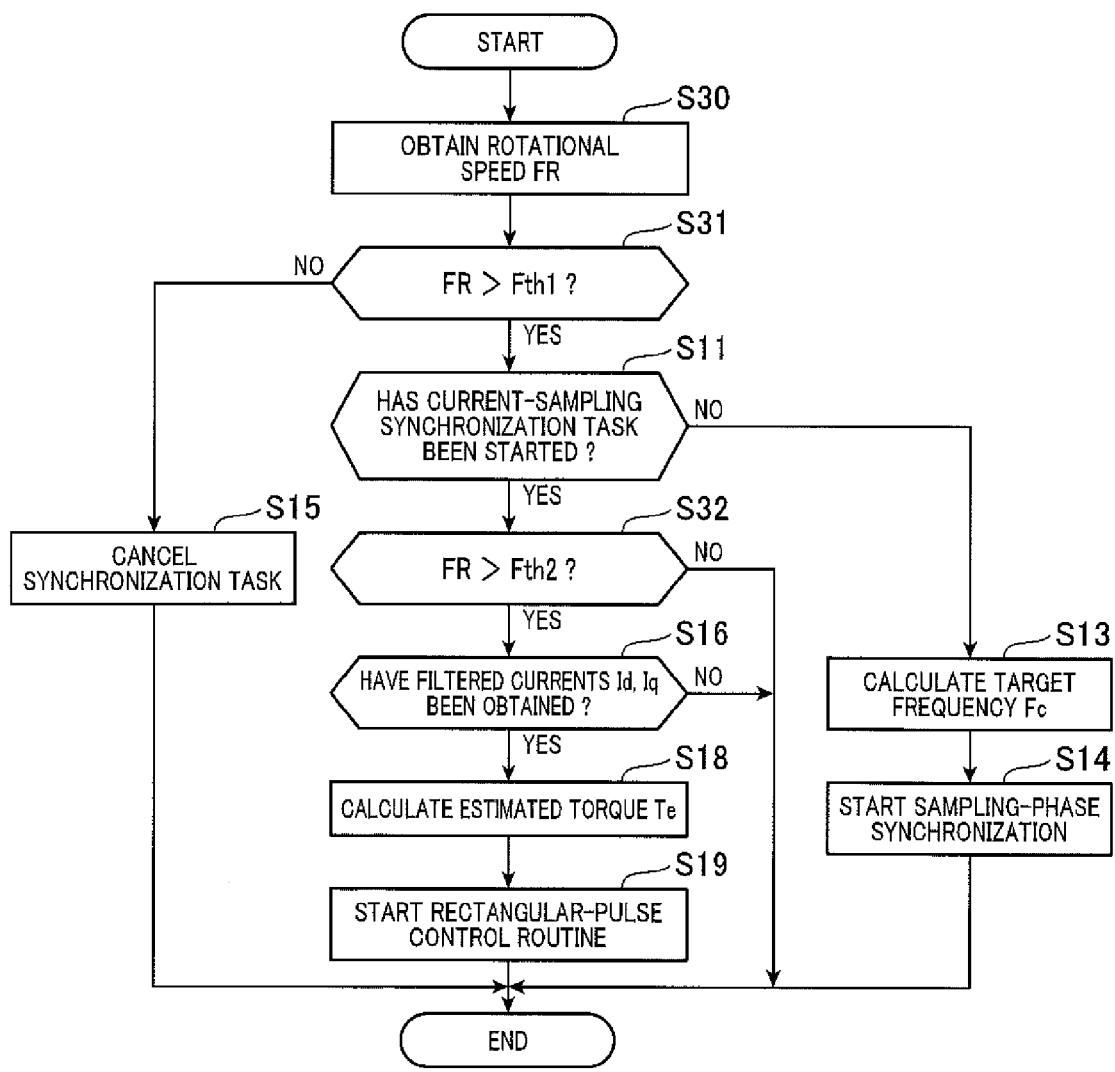
FIG. 12 is a flowchart schematically illustrating a switching control routine carried out by a control apparatus according to the third embodiment of the present disclosure.

The following describes a control system for controlling the motor-generator 10 according to the third embodiment of the present disclosure with reference to FIG. 12.

The structure and/or functions of the control system according to the third embodiment are different from the control system CS according to the first embodiment by the following points. So, the following mainly describes the different points.

The control apparatus 40 according to the third embodiment carries out a switching control routine, which differs from the switching control routine illustrated in FIG. 9. The switching control routine according to the third embodiment is configured to switch the PWM control routine to the rectangular-pulse control routine for every control period while the control apparatus 40 is performing the PWM control routine with reference to FIG. 12. Like operations of the switching control routines respectively illustrated in FIGS. 9 and 12, to which like step numbers are assigned, are omitted or simplified in description to avoid redundant description.

When starting the switching control routine, the control apparatus 40, i.e. the switching control unit 43, calculates the rotational speed FR of the rotor 11 in step S30 in the same approach as the operation in step S12.

Following the operation in step S30, the control apparatus 40 determines whether the rotational speed FR of the rotor 11 exceeds a predetermined rotational-speed threshold Fth1 in step S31.

Upon determining that the rotational speed FR of the rotor 11 does not exceed the rotational-speed threshold Fth1, referred to simply as a threshold Fth1 (NO in step S31), the control apparatus 40 performs the above operation in step S15. Specifically, the control apparatus 40 terminates the switching control routine if the current-sampling synchronization task is not performed, or cancels the current-sampling synchronization task and terminates the switching control routine if the current-sampling synchronization task is performed in step S15.

Otherwise, upon determining that the rotational speed FR of the rotor 11 exceeds the threshold Fth1 (YES in step S31), the control apparatus 40 determines that execution of the current-sampling synchronization task is required. Then, the control apparatus 40 determines whether the current-sampling synchronization task has been started in step S11 set forth above.

In step S11, upon determining that the current-sampling synchronization task has not been started (NO in step S11), the control apparatus 40 performs the current-sampling synchronization task in steps S13 and S14 set forth above.

Otherwise, upon determining that the current-sampling synchronization task has been started (YES in step S11), the control apparatus 40 determines whether the rotational speed FR of the rotor 11 exceeds a predetermined rotational-speed threshold Fth2 that is higher than the threshold Fth1 in step S32.

Upon determining that the rotational speed FR of the rotor 11 does not exceed the rotational-speed threshold Fth2, referred to simply as a threshold Fth2 (NO in step S32), the control apparatus 40 terminates the switching control routine.

Otherwise, upon determining that the rotational speed FR of the rotor 11 exceeds the threshold Fth2 (YES in step S32), the control apparatus 40 determines that switching of the PWM control routine to the rectangular-pulse control routine is required. Then, the control apparatus 40 performs the operations in steps S16, S18, and S19 set forth above.

As described above, the control apparatus 40 according to the third embodiment performs the current-sampling synchronization task upon determining that the rotational speed FR of the rotor 11 exceeds the threshold Fth1 in place of receiving the current-sampling synchronization instruction. The current-sampling synchronization task synchronizes the phases of the measured values of each phase current IU, IV, and IW to be obtained in the PWM control routine with the phases of the measured values of the corresponding each phase current to be obtained in the rectangular-pulse control routine. Execution of the current-sampling synchronization task enables the three-to-two phase converter 45 to obtain measured values of each phase current IU, IV, and IW in the PWM control routine in synchronization with the positive and negative peaks of the carrier signal CA having the target frequency Fc.

After execution of the current-sampling synchronization task, the control apparatus 40 switches control of the motor-generator 10 from the PWM control routine to the rectangular-pulse control routine upon determining that the rotational speed FR of the rotor 11 exceeds the threshold Fth2 in place of receiving the control-routine switching instruction.

That is, the control apparatus 40 enables the three-to-two phase converter 45 to obtain measured values of each phase current IU, iv; and IW in the PWM control routine while performing the PWM control routine if the rotational speed FR of the rotor 11 is within a high rotational-speed range that is higher than the threshold Fth2. This enables the PWM control routine for the motor-generator 10 to be switched to the rectangular-pulse control routine as immediate as the rotational speed FR of the rotor 11 exceeds the threshold Fth2.

Fourth Embodiment

The following describes a control system for controlling the motor-generator 10 according to the fourth embodiment of the present disclosure with reference to FIG. 13.

The structure and/or functions of the control system according to the fourth embodiment are different from the control system CS according to the first embodiment by the following points. So, the following mainly describes the different points.

The control apparatus 40 according to the fourth embodiment carries out a switching control routine, which differs from the switching control routine illustrated in FIG. 9. The switching control routine according to the fourth embodiment is configured to switch the PWM control routine to the rectangular-pulse control routine for every control period while the control apparatus 40 is performing the PWM control routine with reference to FIG. 13. Like operations of the switching control routines respectively illustrated in FIGS. 9 and 13, to which like step numbers are assigned, are omitted or simplified in description to avoid redundant description.

When starting the switching control routine, the control apparatus 40 determines whether the current-sampling synchronization instruction has been input thereto in step S40.

Upon determining that the current-sampling synchronization instruction has not been input to the control apparatus 40 (NO in step S40), the control apparatus 40 performs an operation in step S41, Specifically, the control apparatus 40 terminates the switching control routine if the current-sampling synchronization task is not performed, or cancels the current-sampling synchronization task and terminates the switching control routine if the current-sampling synchronization task is performed in step S41.

Otherwise, upon determining that the current-sampling synchronization instruction has been input to the control apparatus 40 (YES in step S40), the control apparatus 40 determines whether the current-sampling synchronization task has been started thereby in step S42.

Upon determining that the current-sampling synchronization task has not been started (NO in step S42), the control apparatus 40 performs the current-sampling synchronization task. Specifically, the control apparatus 40 changes the sampling timings, which correspond to the respective positive and negative peaks of the triangular carrier signal CA, of each phase current IU, IV, and IW in the PWM control mode to match with the sampling timings, which correspond to the respective predetermined angles (0, 30, 60, 300, and 330 degrees) of the rotational angle θ of the rotor 11, of the corresponding phase current in the rectangular-pulse control mode in step S43.

This starts synchronization of the phases of the measured values of each phase current IU, IV, and IW to be obtained in the PWM control routine with the phases of the measured values of the corresponding phase current to be obtained in the rectangular-pulse control routine. The control apparatus 40 terminates the switching control routine after completion of the operation in step S43. Completion of the operation in step S43 enables the three-to-two phase converter 45 to obtain measured values of each phase current IU, IV, and IW in the PWM control routine each time the rotational angle θ of the rotor 11 reaches one of the predetermined angles (0, 30, 60, . . . , 300, and 330 degrees).

In step S42, upon determining that the current-sampling synchronization task has been started (YES in step S42), the control apparatus 40 deter mines whether the filtered d- and q-axis currents Id and Iq have been obtained by the three-to-two phase converter 45 and the torque estimator 57 in step S44. Upon determining that the filtered B- and q-axis currents Id and Iq have not been obtained yet by the three-to-two phase converter 45 and the torque estimator 57 (NO in step S44), the control apparatus 40 terminates the switching control routine.

Otherwise, upon determining that the filtered d- and q-axis currents Id and Iq have been obtained by the three-to-two phase converter 45 and the torque estimator 57 (YES in step S44), the control apparatus 40 determines whether the control-routine switching instruction has been input thereto in step S45.

Upon determining that the control-routine switching instruction has not been input to the control apparatus 40 (NO in step S45), the control apparatus 40 terminates the switching control routine.

Otherwise, upon determining that the control-routine switching instruction has been input to the control apparatus 40 (YES in step S45), the control apparatus 40 cancels the current-sampling synchronization task, and calculates the estimated torque Te in accordance with the filtered d- and q-axis currents Id and Iq in step S46. Following the operation in step S46, the control apparatus 40 switches the PWM control routine to the rectangular-pulse control routine, and starts the rectangular-pulse control routine in step S47. Specifically, the switching control unit 43 outputs a control signal to switch the PWM control routine to the rectangular-pulse control routine to the selector 44, so that the selector 44 selects the duty signals gU2, gV2, and gW2 to input to both the dead-time generator 55 therethrough and the respective NOT circuits 54U, 54V, and 54W.

After completion of the operation in step S47, the control apparatus 40 terminates the switching control routine.

As described above, the control apparatus 40 according to the fourth embodiment changes the sampling timings of each phase current IU, IV, and IW in the PWM control mode to the sampling timings of the corresponding phase current in the rectangular-pulse control mode. This enables measured values of the three-phase currents IU, IV, and IW, which are used to perform the rectangular-pulse control routine, to be sampled while the control apparatus 40 is performing the PWM control routine. This configuration prevents the torque responsivity of the motor-generator 10 from decreasing when control of the motor-generator 10 is switched from the PWM control routine to the rectangular-pulse control routine.

Each of the first to fourth embodiments can be modified as follows.

The three-to-two phase converter 45 performs a low-pass filtering process to eliminate the high-frequency components, which are higher than the predetermined threshold frequency, from the d- and q-axis currents Id and Iq, but the present disclosure is not limited thereto. Specifically, the torque estimator 57 can perform a low-pass filtering process to eliminate high-frequency components, which are higher than a predetermined threshold frequency, from the estimated torque Te. In this modification, the deviation calculator 58 uses the filtered estimated torque Te as the estimated torque Te to subtract the filtered estimated torque Te from the command torque T* to calculate a torque deviation ΔT between the filtered estimated torque Te and the command torque T*. In this modification, in step S16, the control apparatus 40 determines whether the filtered estimated torque Te has been obtained by the three-to-two phase converter 45 and the torque estimator 57 in place of the filtered d- and q-axis currents Id and Iq.

The time constant of the low-pass filter function of the three-to-two phase converter 45 or the torque estimator 57 can be set to be different from one cycle of the three-phase voltage commands VU*1, VV*1, and VW*1. For example, the time constant of the low-pass filter function of the three-to-two phase converter 45 or the torque estimator 57 can be set to half cycle or two cycles of the three-phase voltage commands VU*1, VV*1, and VW*1.

Each of the first to fourth embodiments performs the rectangular-pulse control routine as an example of the torque-feedback control routine. That is, the torque-feedback control routine is configured to obtain measured values of each phase current IU, N, and IW at predetermined phases of the corresponding phase current, and adjust the waveform of the output voltage of the inverter 20 according to the obtained measured values of each phase current IU, IV, and IW at the predetermined phases and command torque T*.

For example, each of the first to fourth embodiments can perform a pulse-pattern selection routine as another example of the rectangular-pulse control routine. The pulse-pattern selection routine selects one pulse voltage pattern in a plurality of prepared pulse voltage patterns in accordance with the obtained measured values of each phase current IU, IV, and IW at the predetermined phases and command torque T*. Then, the pulse-pattern selection routine adjusts the phase of the selected pulse voltage pattern according to the deviation between the estimated torque Te and the command torque T*.

The control apparatus 40 according to each of the first and fourth embodiments is configured to receive the current-sampling synchronization instruction and the control-routine switching instruction, which are individually input thereto. The present disclosure is however not limited to the configuration.

Specifically, the control apparatus 40 can determine whether the control-routine switching instruction has been input thereto in each of steps S10 and S40. Upon determining that the control-routine switching instruction has been input to the control apparatus 40 (YES in step S10 or S40) and that the current-sampling synchronization task has not been started (NO in step S11), the control apparatus 40 can perform the current-sampling synchronization task. In this modification, upon determining that the filtered d- and q-axis currents Id and Iq have been obtained by the three-to-two phase converter 45 and the torque estimator 57 (YES in step S16 or S44), the control apparatus 40 can switch the PWM control routine to the rectangular-pulse control routine (see steps S18 and S19 or steps S46 and S47) without performing the operation in step S17 or S45. That is, the control system according to this modification is configured such that the current-sampling synchronization instruction is eliminated.

The second embodiment can be configured such that the threshold Ath1 and the threshold Ath2 are set to be identical to each other, and the third embodiment can be configured such that the threshold Fth1 and the threshold Fth2 are set to be identical to each other.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for adjusting an output voltage from an inverter to a rotary electric machine to control the rotary electric machine, the apparatus comprising:
    a first control unit configured to perform a current-feedback control routine, the current-feedback control routine being configured to:
        set a sinusoidal voltage command based on command torque for output torque of the rotary electric machine and the output currents; and
        compare the sinusoidal voltage command with a periodic carrier signal to control the output voltage accordingly;
    a second control unit configured to perform a torque-feedback control routine, the torque-feedback control routine being configured to:
        sample values of each of the output currents at predetermined phases, the sampled values of each of the output currents at the predetermined phases being referred to as phase-related sampled values of the corresponding output current;
        control, based on the phase-related sampled values of each of the output currents and the command torque, a waveform of the output voltage; and
    a switching control unit configured to:
        switch control of the rotary electric machine between the current-feedback control routine and the torque-feedback control routine; and
        cause the second control unit to sample values of each of the output currents at the predetermined phases while the first control unit is performing the current-feedback control routine when switching the current-feedback control routine to the torque-feedback control routine,
    the second control unit being configured to use the values of each of the output currents sampled while the first control unit is performing the current-feedback control routine as the phase-related sampled values of the corresponding output current to start the torque-feedback control routine when the current-feedback control routine is switched to the torque-feedback control routine.

2. The apparatus according to claim 1, wherein:
    the first control unit is configured to:
        obtain a value of each of the output currents each time the periodic carrier signal becomes a predetermined phase; and
        set the sinusoidal voltage command based on the command torque and the obtained values of the output currents; and
    the switching control unit is configured to adjust a frequency of the periodic carrier signal while the first control unit is performing the current-feedback control routine such that:
        the second control unit uses the values of each of the output currents obtained by the first control unit as the phase-related sampled values of the corresponding output current.

3. The apparatus according to claim 1, wherein:
the switching control unit is configured to synchronize phases of the obtained values of each of the output currents with the predetermined phases of the corresponding output current used for current sampling by the torque-feedback control routine.

4. The apparatus according to claim 2, wherein:
the switching control unit is configured to synchronize phases of the obtained values of each of the output currents with the predetermined phases of the corresponding output current used for current sampling by the torque-feedback control routine.

5. The apparatus according to claim 1, wherein:
the output voltage has a rectangular-pulse waveform during execution of the torque-feedback control routine; and
the second control unit is configured to perform, as the torque-feedback control routine, a rectangular-pulse control routine that adjusts a phase of the output voltage having the rectangular-pulse waveform.

6. The apparatus according to claim 1, wherein:
the rotary electric machine comprises a rotor; and
the switching control unit is configured to:
  obtain a rotational speed of the rotor; and
  perform switching of control of the rotary electric machine from the current-feedback control routine to the torque-feedback control routine when the rotational speed of the rotor exceeds a first rotational-speed threshold.

7. The apparatus according to claim 6, wherein:
the second control unit uses the values of each of the output currents obtained by the first control unit as the phase-related sampled values of the corresponding output current when the rotational speed of the rotor exceeds a second rotational-speed threshold, the second rotational-speed threshold being set to be lower than the first rotational-speed threshold.

8. The apparatus according to claim 1, wherein:
the switching control unit is configured to:
  obtain a modulation ratio of the inverter; and
  perform switching of control of the rotary electric machine from the current-feedback control routine to the torque-feedback control routine when the modulation ratio of the inverter exceeds a first modulation-ratio threshold.

9. The apparatus according to claim 8, wherein:
the second control unit uses the values of each of the output currents obtained by the first control unit as the phase-related sampled values of the corresponding output current when the modulation ratio of the inverter exceeds a second modulation-ratio threshold, the second modulation-ratio threshold being set to be lower than the first modulation-ratio threshold.

* * * * *